INVENTORS
Alfred H. Miller,
Glenn Perry and
Lawrence C. Wheat
Nobbe & Swope
ATTORNEYS Sept. 19, 1967  A. H. MILLER ETAL  3,341,889
APPARATUS FOR SHAPING THERMOPLASTIC SHEETS
Filed Oct. 21, 1964  18 Sheets-Sheet 11

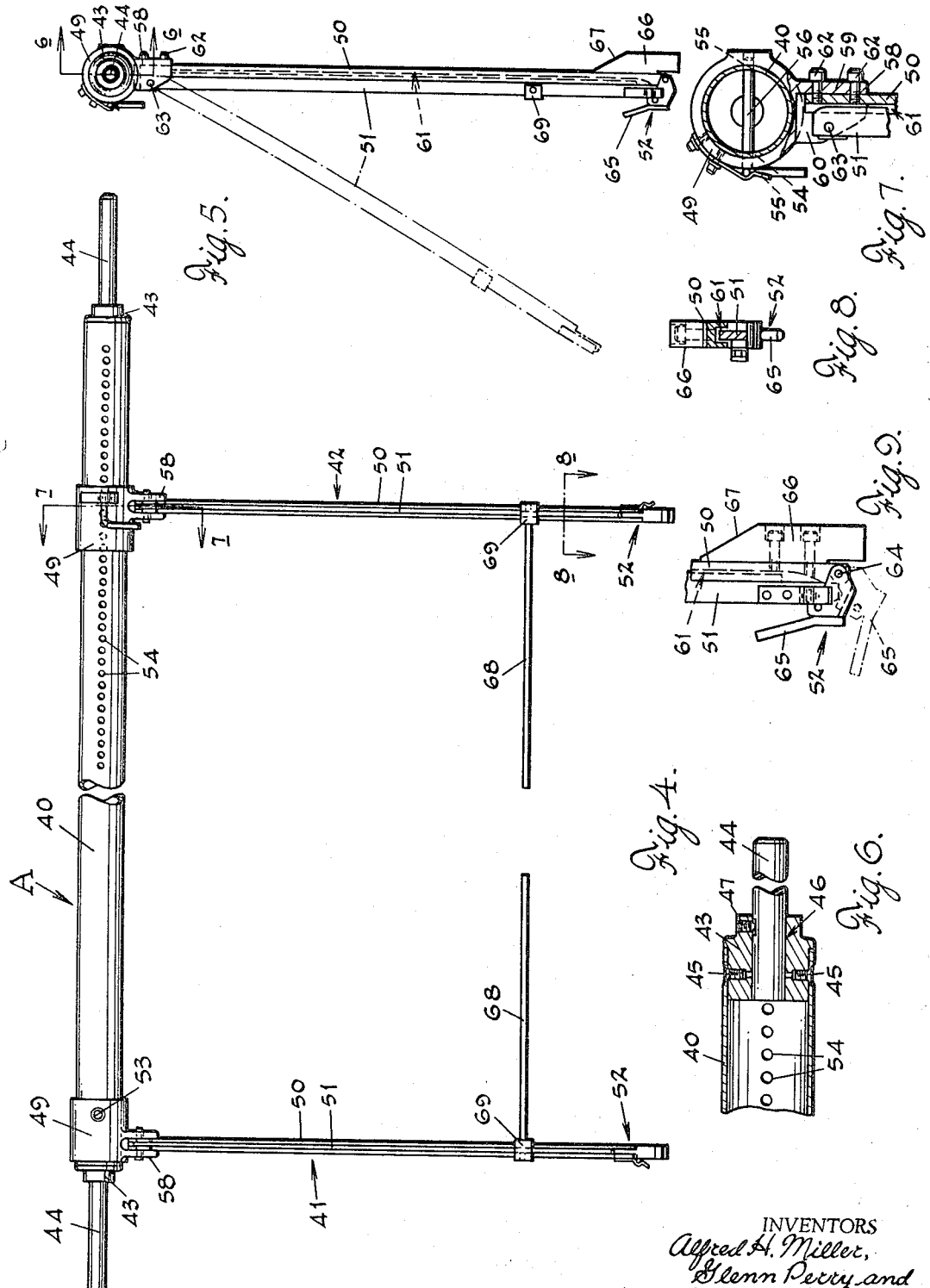

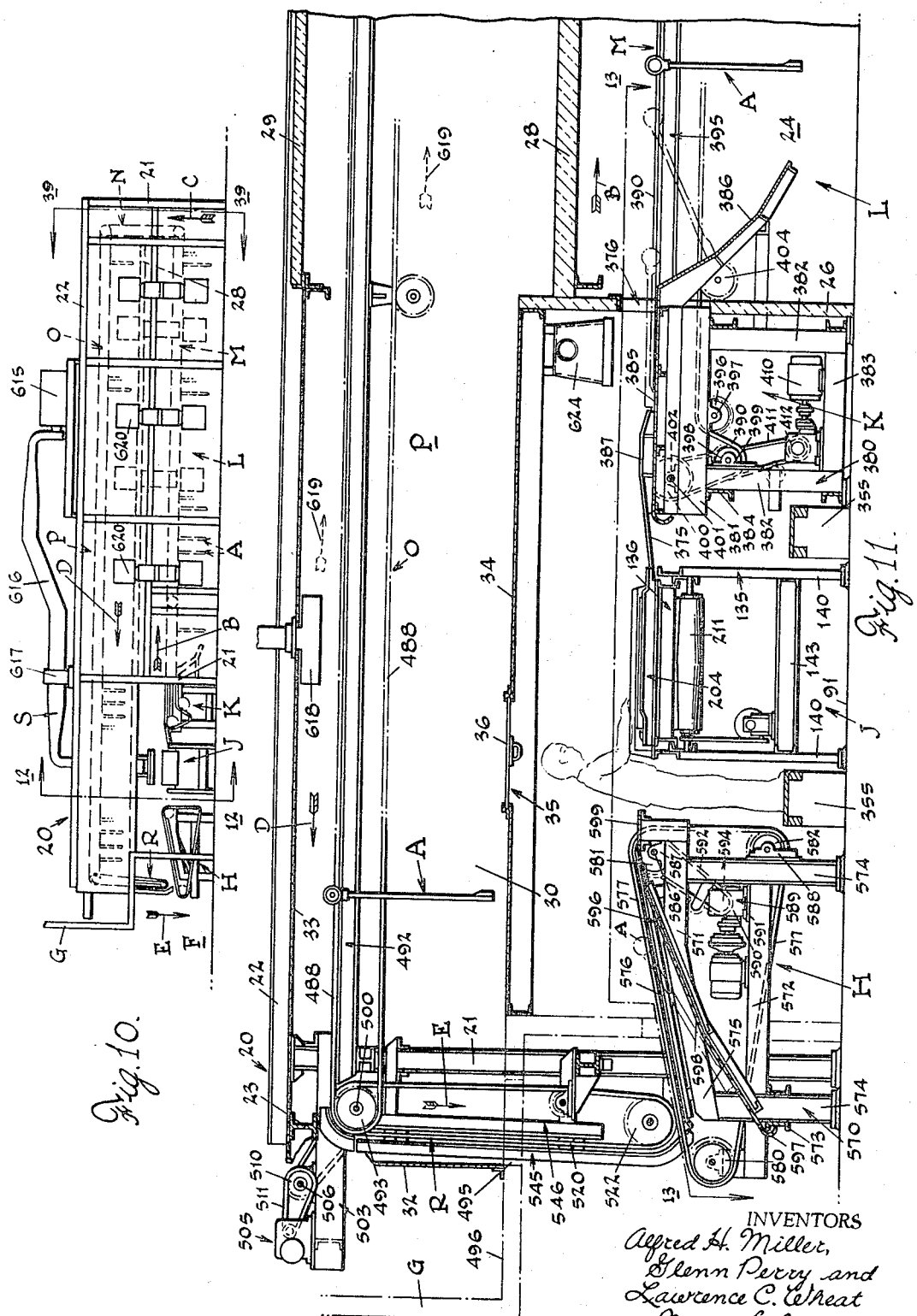

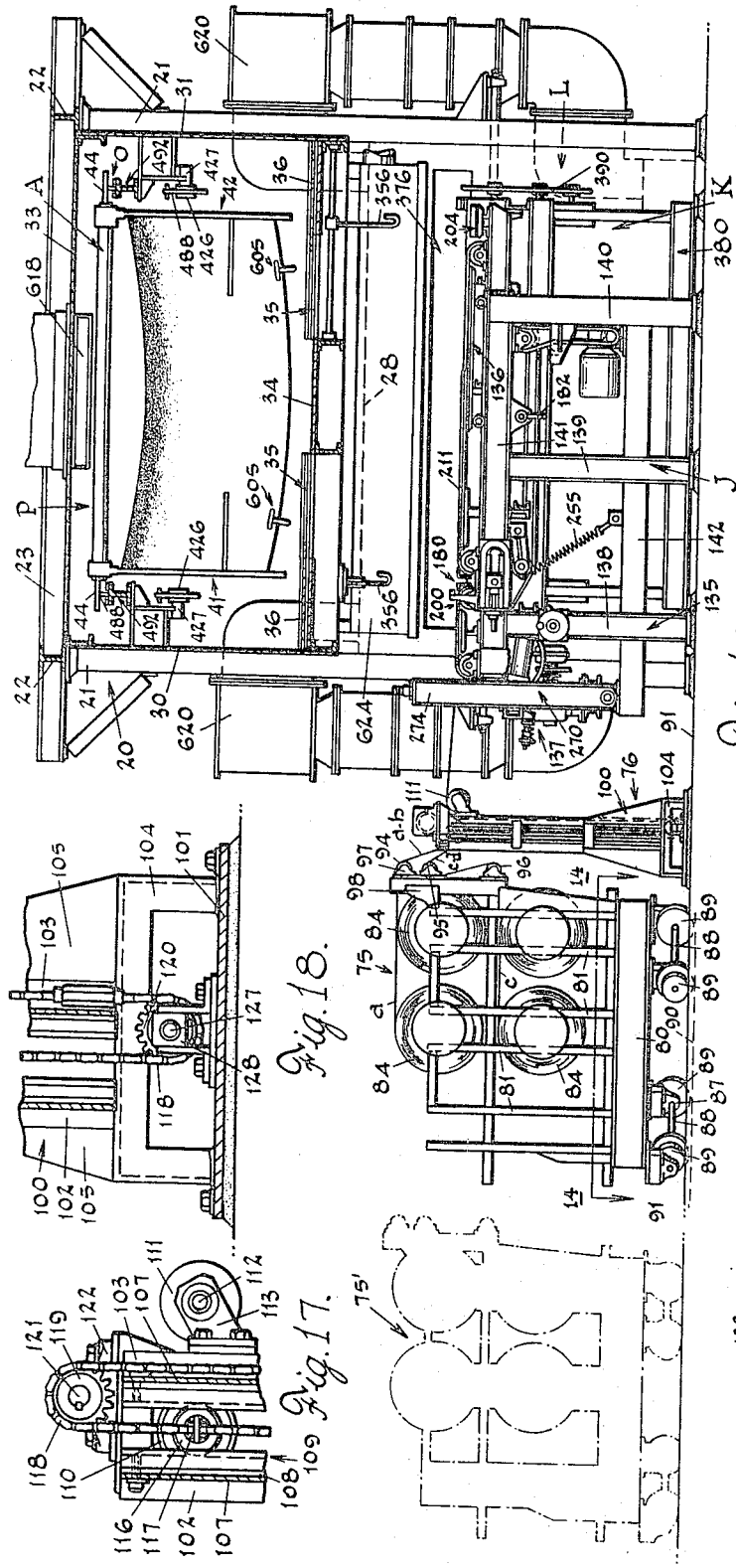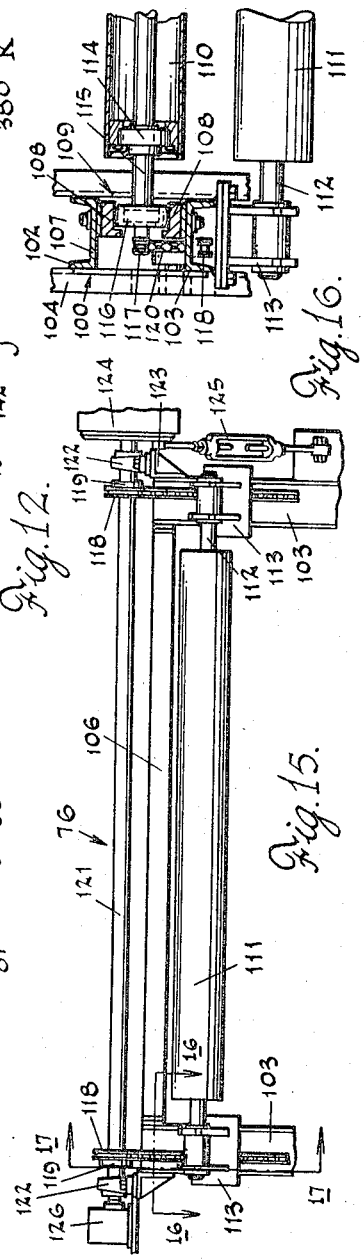

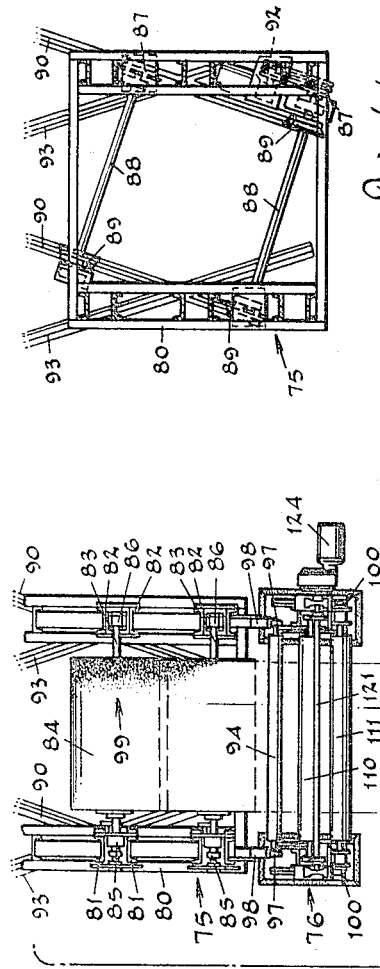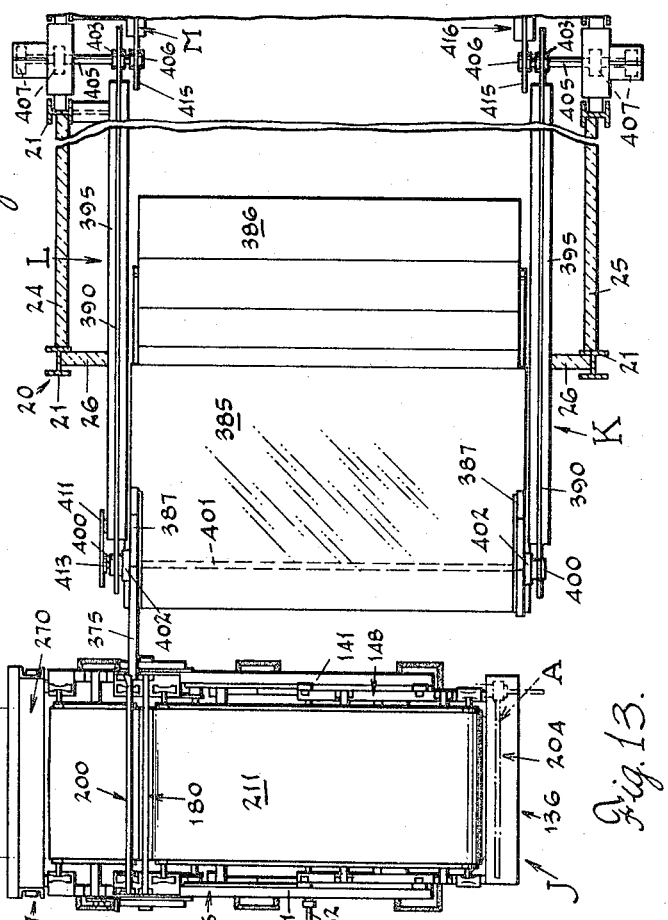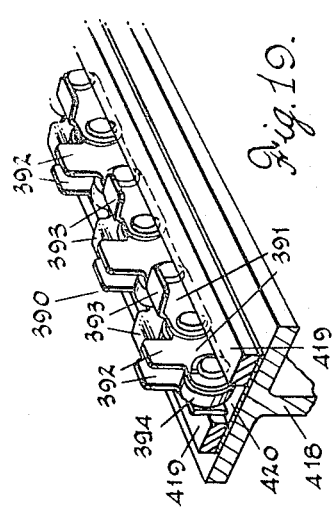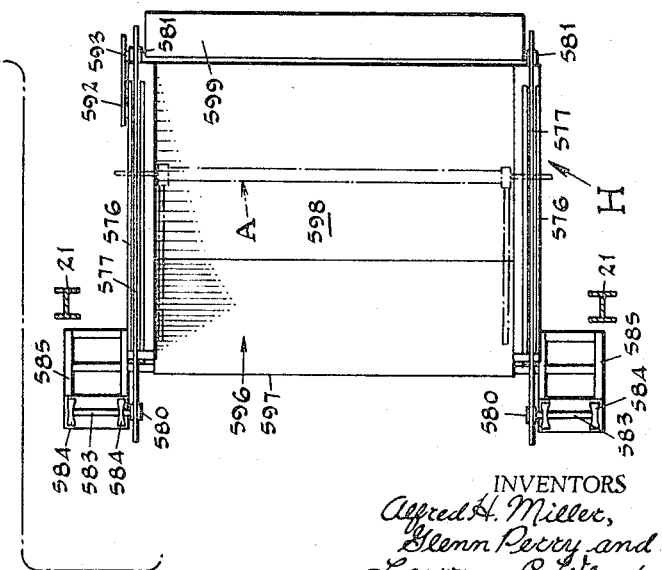

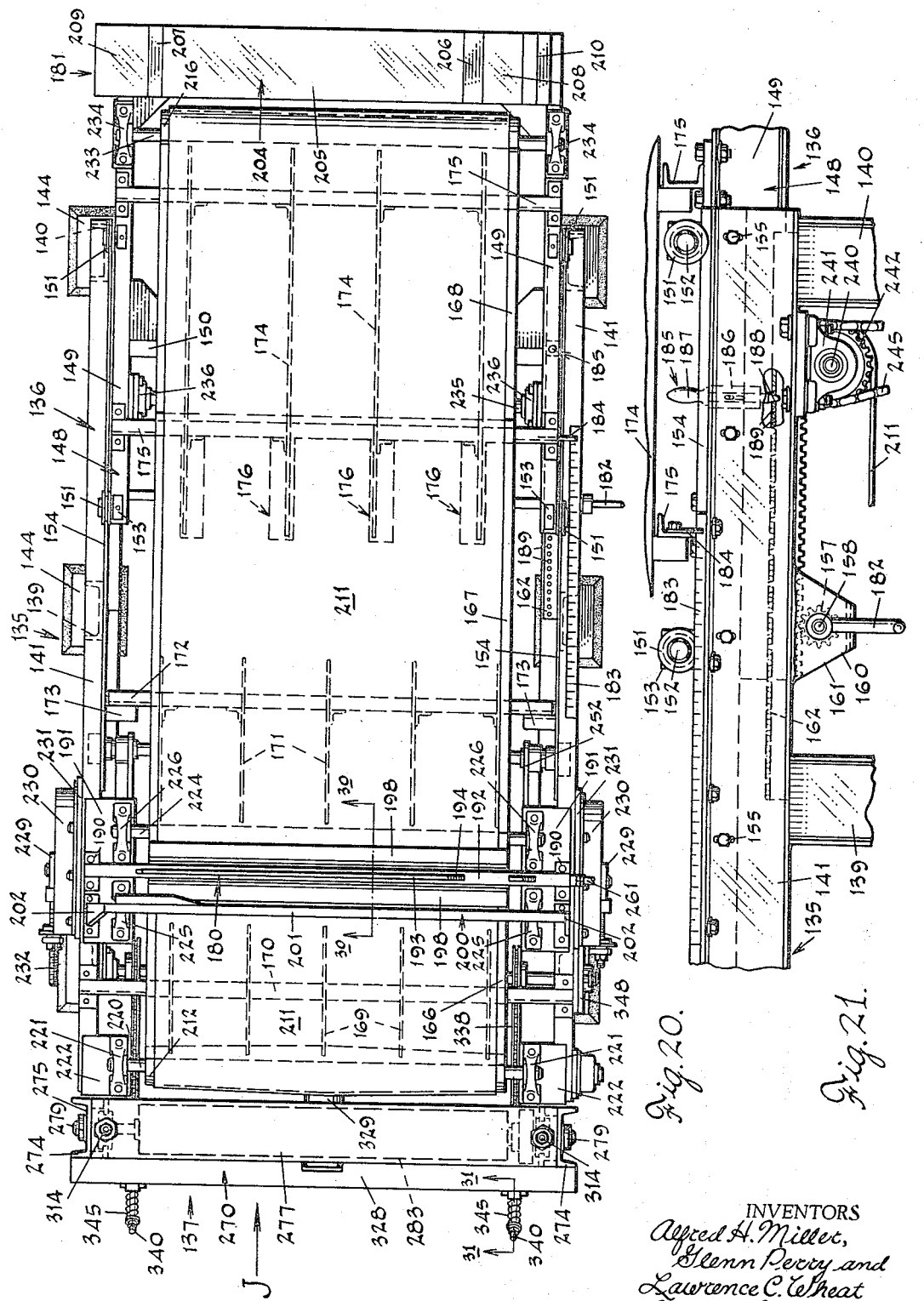

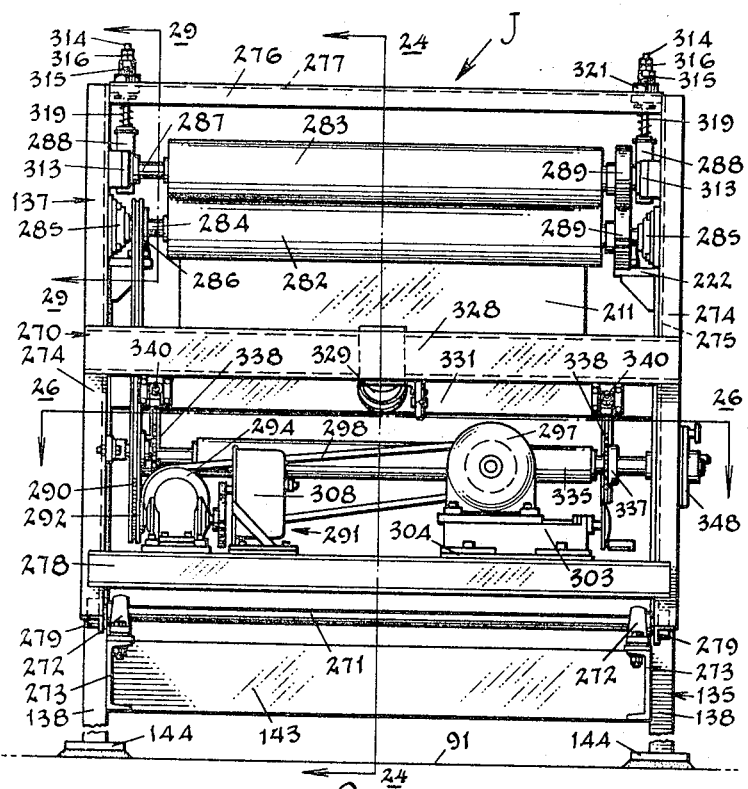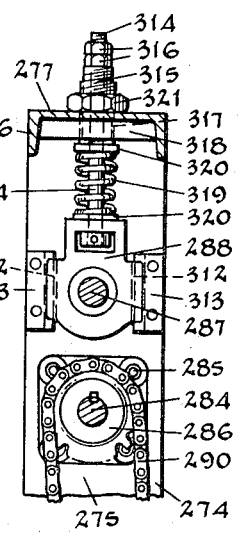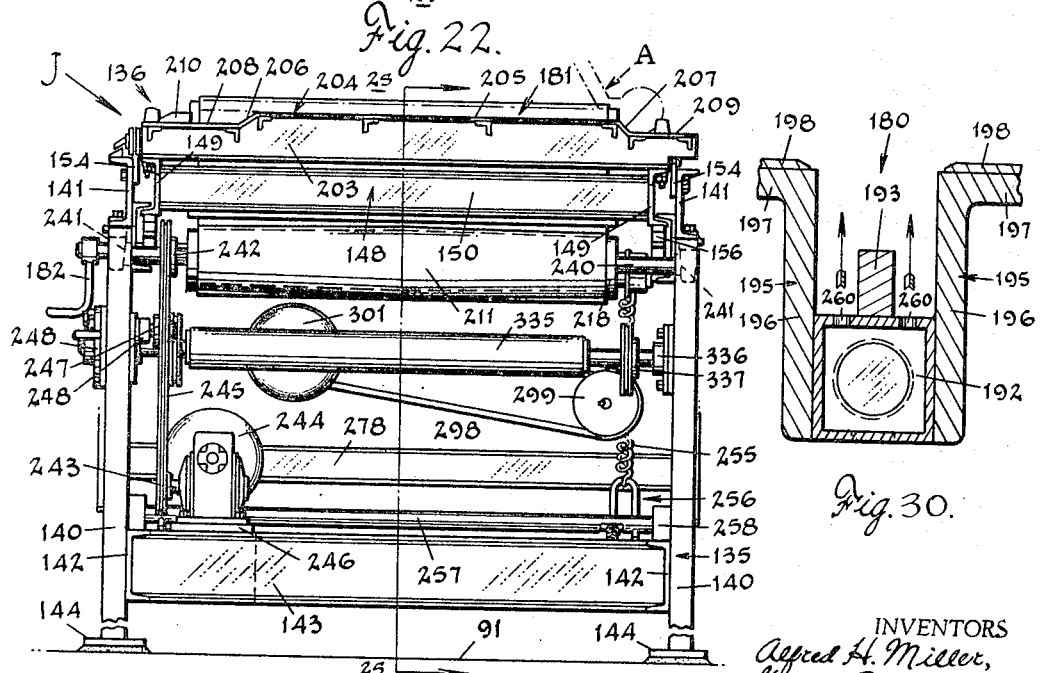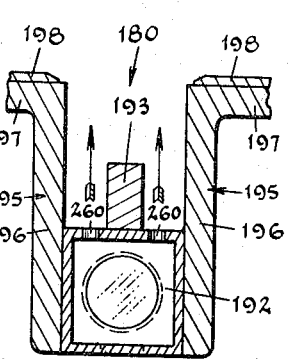

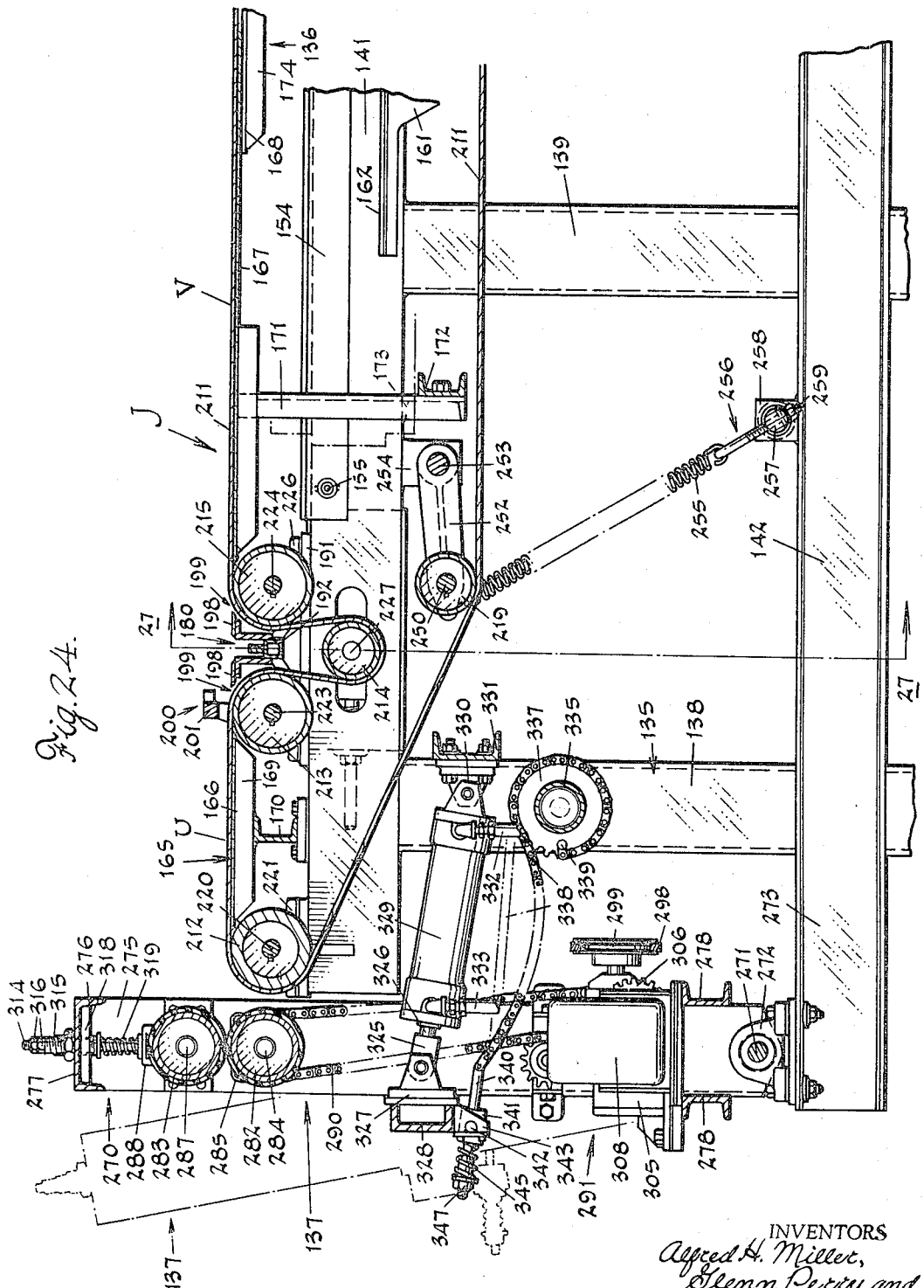

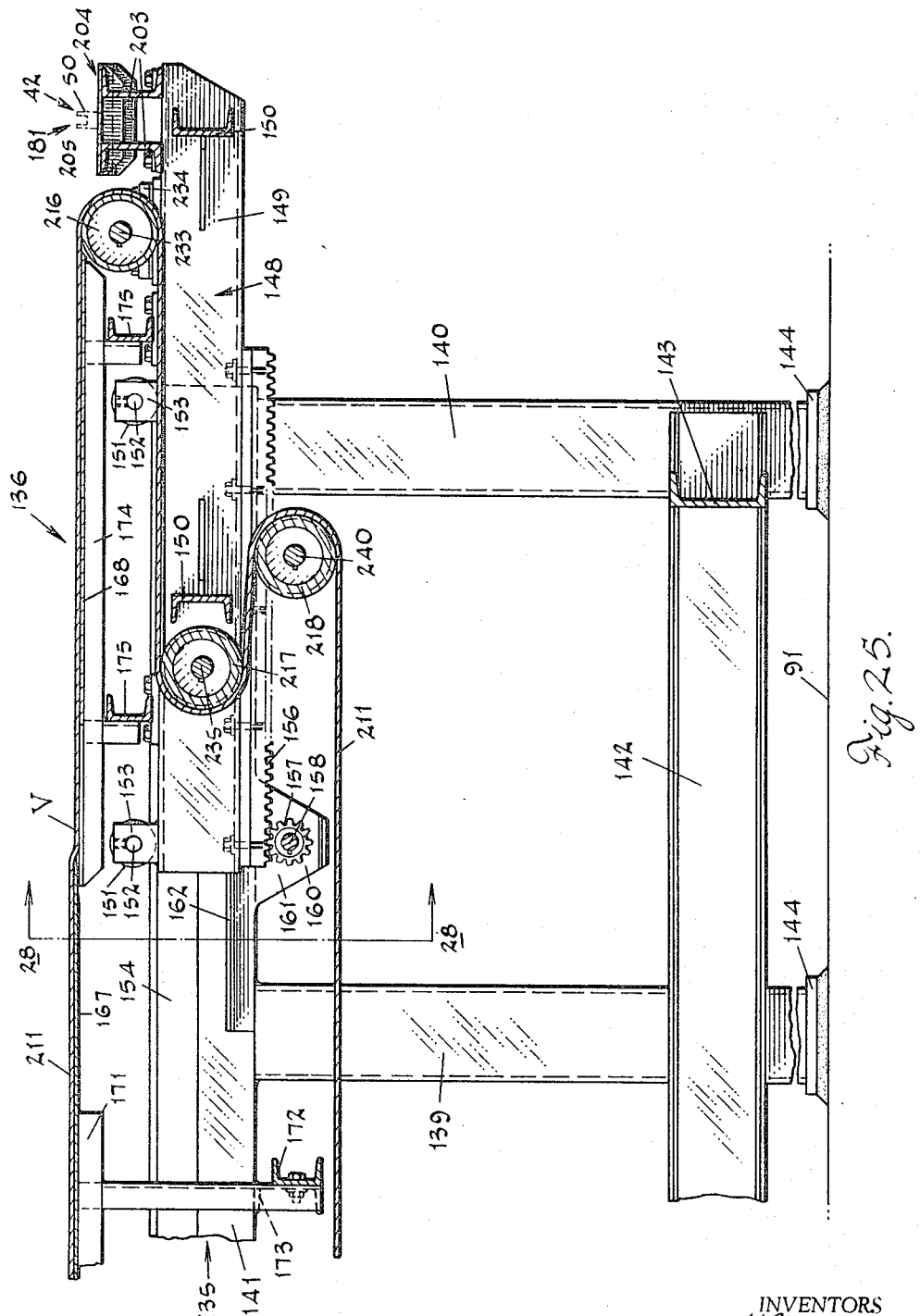

INVENTORS
Alfred H. Miller,
Glenn Perry and
Lawrence C. Wheat
Nobbe & Swope
ATTORNEYS

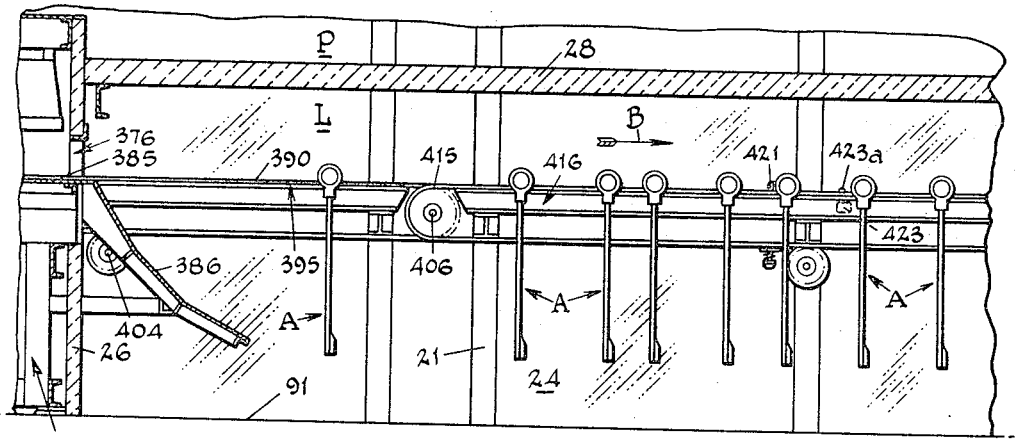
Fig. 35.
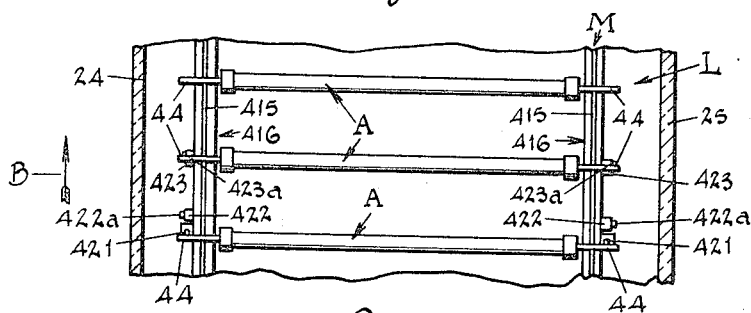
Fig. 36.
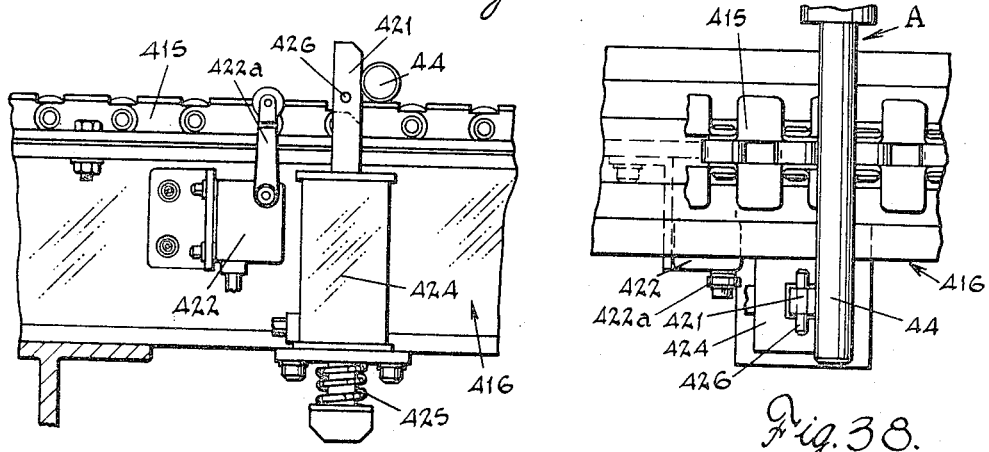
Fig. 37.
Fig. 38.
INVENTORS
Alfred H. Miller,
Glenn Perry and
Lawrence C. Wheat
Nobbe & Swope
ATTORNEYS INVENTORS
Alfred H. Miller,
Glenn Perry and
Lawrence C. Wheat
Nobbe & Swope
ATTORNEYS

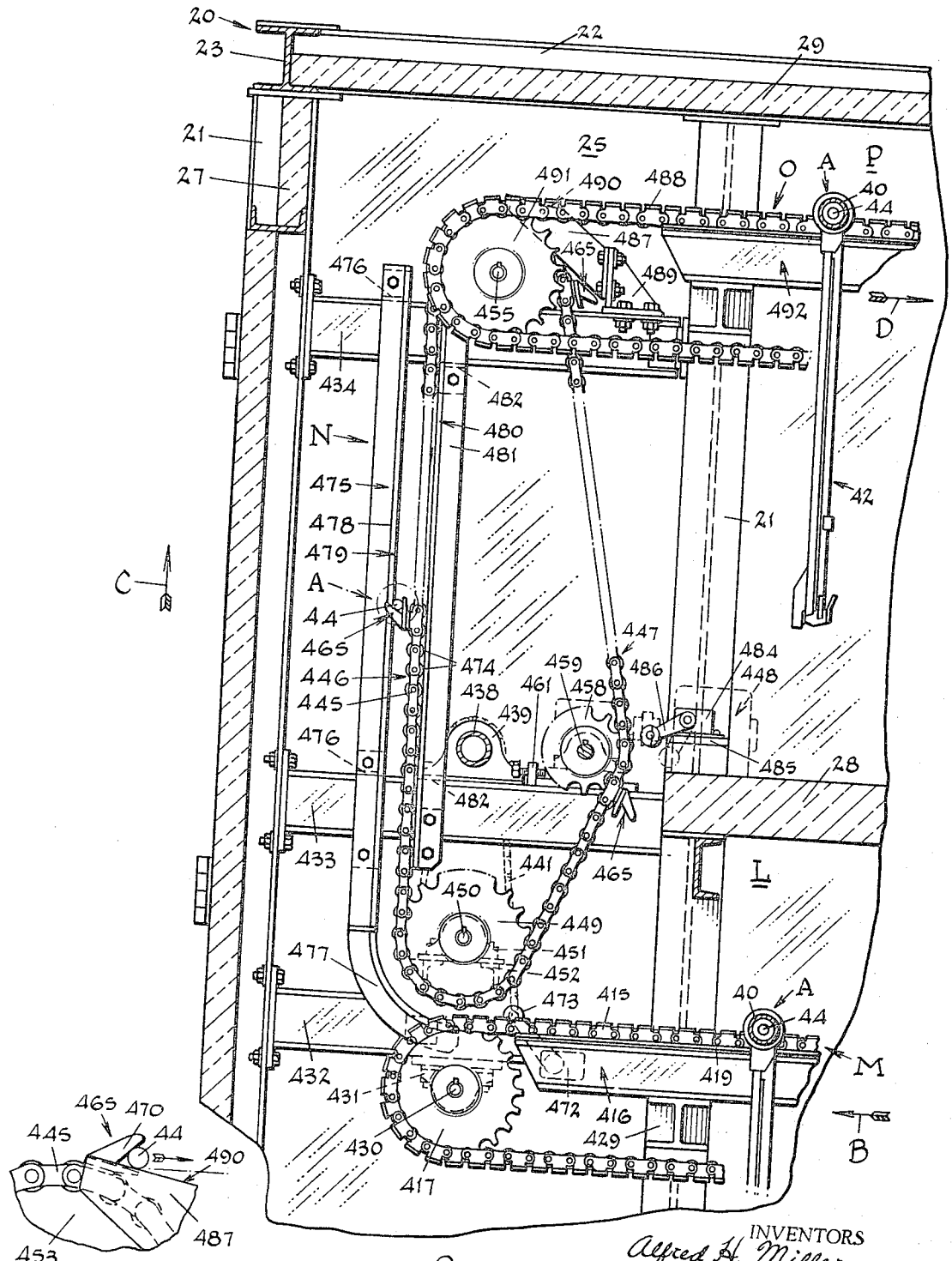

Sept. 19, 1967 A. H. MILLER ETAL 3,341,889
APPARATUS FOR SHAPING THERMOPLASTIC SHEETS
Filed Oct. 21, 1964 18 Sheets-Sheet 15
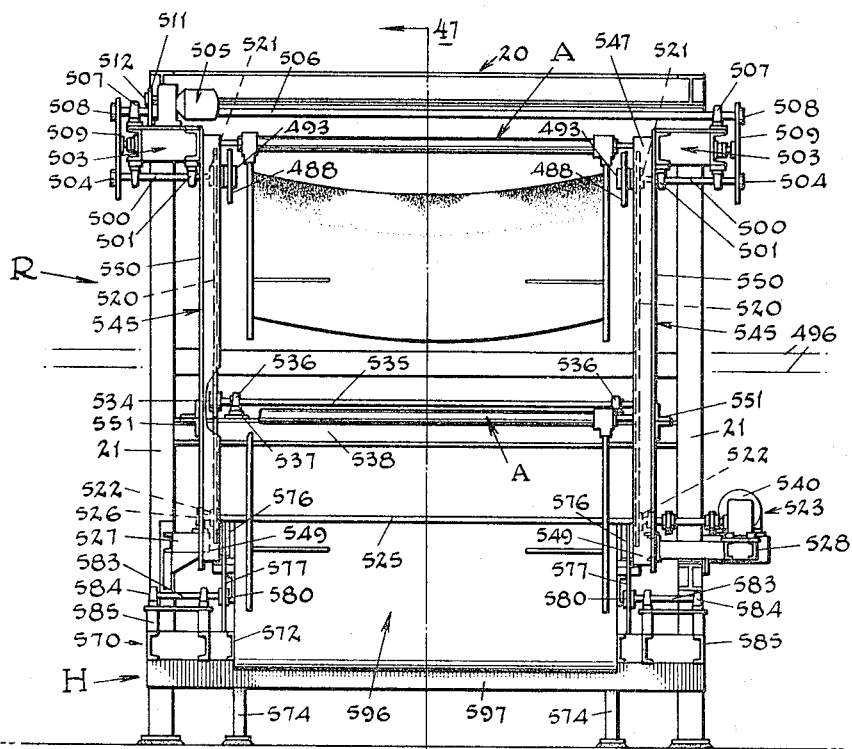
Fig. 46.
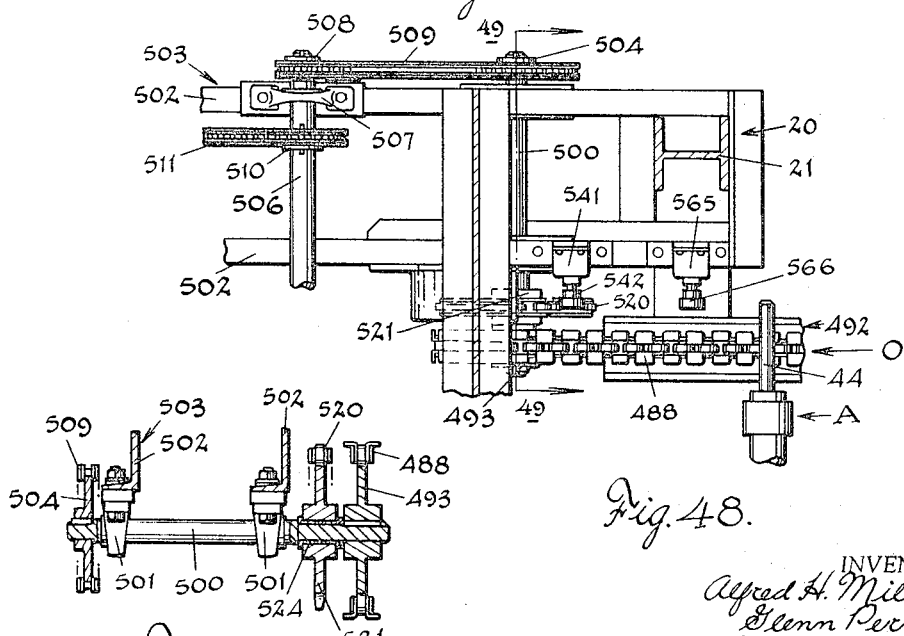
Fig. 48.
Fig. 49.
INVENTORS
Alfred H. Miller,
Glenn Perry and
Lawrence C. Wheat
Nobbe & Swope
ATTORNEYS Sept. 19, 1967  A. H. MILLER ET AL  3,341,889
APPARATUS FOR SHAPING THERMOPLASTIC SHEETS
Filed Oct. 21, 1964  18 Sheets-Sheet 18

INVENTORS
Alfred H. Miller,
Glenn Perry, and
Lawrence C. Wheat
Nobbe & Swope
ATTORNEYS

United States Patent Office 3,341,889
Patented Sept. 19, 1967

3,341,889
APPARATUS FOR SHAPING THERMOPLASTIC SHEETS
Alfred H. Miller, Glenn Perry, and Lawrence C. Wheat, Toledo, Ohio, assignors to Libbey-Owens-Ford Glass Company, Toledo, Ohio, a corporation of Ohio
Filed Oct. 21, 1964, Ser. No. 405,383
15 Claims. (Cl. 18—4)

ABSTRACT OF THE DISCLOSURE

Apparatus for shaping thermoplastic sheets in which a substantially continuous length of plastic sheeting is withdrawn from a source of supply and the free end portion thereof clamped under longitudinal tension in a frame, after which the sheeting is cut transversely outwardly of the frame to provide an individual sheet clamped in said frame, the frame being then hung in a vertical position and conveyed successively through a heating chamber and a cooling chamber during which the plastic sheet is shaped by the application of tractive forces to the lower edge thereof.

---

The present invention relates generally to the manufacture of glare-reducing windows, or the like and more particularly to an improved apparatus for shaping the plastic interlayer for curbed or bent laminated safety glass windshields or windows when said interlayer is provided with a glare-reducing portion.

In shaping the plastic interlayers for laminated safety glass windshields or windows it has been customary to first cut a continuous length or roll of plastic into individual sheets, and then clamp each individual sheet along two opposite edges only in a frame to hold it in its normal shape. Tractive forces are then applied to the lower unsupported edge of the sheet while supporting the frame and sheet in a vertical position and simultaneously heating the sheet until it has been stretched or shaped in the desired manner. After heating, the sheet is cooled to retain its desired shape. It has heretofore been the practice to clamp only a single sheet of plastic in a frame, with a plurality of such frames being hung in a vertical position on a rack or truck which is then passed first into a heating chamber and subsequently into a cooling chamber.

While the invention is applicable to the shaping of individual plastic sheets supported in separate frames, it is of particular utility where a plurality of continuous lengths of thermoplastic material are withdrawn from separate sources of supply and, while superimposed one upon the other, are clamped at their free ends in a frame and uniformly stretched or placed in tension. While maintained in tension, the continuous lengths of plastic are also clamped in the frame at a point remote from the free ends thereof and then cut transversely from the continuous lengths outwardly of the frame to provide a plurality of individual sheets. A succession of frames, each with a plurality of uniformly taut or tensioned sheets clamped therein, are supported in vertical position and moved in spaced relation first through a heating zone and then through a cooling zone. During the heating of the sheets, tractive forces applied to the lower unsupported edges thereof cause said sheets to be stretched or distorted in the plane of the sheets to the desired curvature or shape.

As herein provided, the air in both the heating zone and cooling zone is maintained within desired ranges of working temperatures whereby the plastic sheets will become shaped while heat-softened and then set in the desired curvature to which they were shaped as they are cooled. To obtain gradual drying of the sheets as they cool, conditioned air is supplied to the cooling zone and as the frames reach the exit end of said cooling zone, they are successively conveyed with the shaped sheets into a room of closely controlled temperature and humidity to obviate the tendency of the plastic to relax, due to its "elastic memory," from the curvature to which it was shaped. The plastic sheets are maintained under such controlled conditions until assembled with the glass sheets in the manufacture of laminated safety glass.

It is therefore a primary object of the present invention to provide an improved apparatus for shaping sheets of plastic material employed as the interlayer in the production of curved or bent laminated safety glass windows or windshields having a glare-reducing area in a substantially continuous manner.

Another object of the invention is to provide apparatus for shaping plastic sheets having a colored band along and parallel to one marginal edge of the sheet, in which a substantially continuous length of plastic material is withdrawn from a source of supply and clamped at the free end thereof in one end of a frame and also clamped at a point remote from said free end in the opposite end of said frame, the plastic being then cut transversely outwardly of the frame to form an individual sheet of predetermined size, the frame with the sheet clamped therein being hung in a vertical position with the colored band at the upper edge thereof, and tractive forces being applied to the lower edge of the sheet and in the plane of the sheet and the sheet then heated to cause it to be deflected downwardly resulting in the upper and lower longitudinal edges thereof being curved in the same direction, after which the sheet is cooled.

Another object of the invention is to provide such an apparatus wherein a plurality of substantially continuous lengths of plastic material are drawn from a plurality of sources of supply and sections of predetermined length transversely clamped in a frame along two spaced lines in such a manner as to place the clamped sections under uniform tension, after which the continuous lengths of plastic are cut transversely outwardly of the frame to provide individual sheets which are shaped in the above manner.

Another object of the invention is to provide such an apparatus in which the substantially continuous lengths of plastic material are drawn from the sources of supply in superimposed contacting relation between a pair of feed rolls and the free ends thereof clamped together, after which the feed rolls are moved outwardly to place the plastic material under tension, the plastic material being then clamped inwardly of the free ends thereof to provide uniformly taut sections of predetermined length before the continuous lengths of plastic are cut to form individual sheets.

A further object of the invention is to provide such an apparatus in which the plurality of substantially continous lengths of plastic material after being drawn from their separate sources of supply and before passing between the feed rolls are permitted, while hanging in freely suspended loops, to relax and obtain a uniformity of lineal tension prior to their being clamped in a frame and cut into individual sheets.

A further object of the invention is to provide such an apparatus in which a plurality of frames, each having a plurality of plastic sheets clamped therein, are hung in a vertical position and moved substantially continuously in spaced relation to one another through a zone of controlled humidity and heated air to cause the plurality of sheets to be shaped by downward deflection and then passed through a zone of controlled humidity and cooling air to set the shaped curvature therein after which the sheets are removed from each of the frames for storage in a room having controlled temperature and humidity.

Other objects and advantages of the invention will become more apparent during the course of the following description when read in connection with the accompanying drawings.

In the drawings, wherein like numerals are employed to designate like parts throughout the same:

FIG. 4 is a front elevation of a support frame for distortion of thermoplastic sheets in accordance with the invention;

FIG. 5 is an end elevation of the support frame;

FIG. 6 is a longitudinal vertical section taken on line 6—6 of FIG. 5;

FIG. 7 is a transverse vertical section taken on line 7—7 of FIG. 4;

FIG. 8 is a horizontal section taken on line 8—8 of FIG. 4;

FIG. 9 is an enlarged detail view of a clamping member of the support frame;

FIG. 10 is a schematic side elevation of a continuous distortion apparatus constructed in accordance with the invention;

FIG. 11 is an enlarged longitudinal vertical section of one end of the apparatus;

FIG. 12 is a transverse vertical section taken on line 12—12 of FIG. 10;

FIG. 13 is a horizontal section taken on line 13—13 of FIG. 11;

FIG. 14 is a horizontal section of a roll stand and taken on line 14—14 of FIG. 12;

FIG. 15 is a fragmentary view of the upper end of a thermoplastic sheeting feeder unit;

FIG. 16 is a horizontal section taken on line 16—16 of FIG. 15;

FIG. 17 is a transverse section taken on line 17—17 of FIG. 15, and illustrates the upper end of the feeder unit;

FIG. 18 is a detail view at the lower end of the feeder unit;

FIG. 19 is a fragmentary perspective view of one form of conveyor chain and of a support track on which the same is supported;

FIG. 20 is a plan view of an assembly and stretching unit;

FIG. 21 is an enlarged fragmentary side elevation of the assembly unit;

FIG. 22 is a view of one end of the assembly unit;

FIG. 23 is a similar view of the opposite end of the unit;

FIG. 24 is a longitudinal vertical section of the unit and as taken on line 24—24 of FIG. 22;

FIG. 25 is a longitudinal section taken on line 25—25 of FIG. 23;

FIG. 29 is a transverse vertical section taken on line 29—29 of FIG. 22;

FIG. 30 is an enlarged detail view taken on line 30—30 of FIG. 20;

FIG. 35 is a longitudinal vertical section of the entry end of the heating oven;

FIG. 36 is a fragmentary plan view illustrating latching means for locating the frames in spaced order within the heating oven;

FIG. 37 is a side elevation of the latching means;

FIG. 38 is a plan view of the latching means;

FIG. 40 is a longitudinal vertical section taken on line 40—40 of FIG. 39;

FIG. 43 is a fragmentary detail view;

FIG. 46 is an end elevation of a second transfer area of the apparatus;

FIG. 47 is a longitudinal vertical section taken on line 47—47 of FIG. 46;

FIG. 48 is a horizontal section taken on line 48—48 of FIG. 47;

FIG. 49 is a transverse vertical section taken on line 49—49 of FIG. 48;

Figure 1:
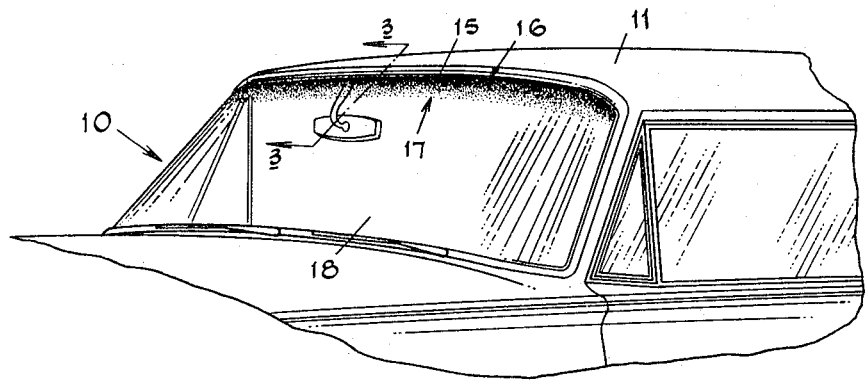
FIG. 1 is a perspective view of a windshield, produced in accordance with this invention, shown in its functional position in the windshield opening of an automobile.

In FIG. 1 of the drawings, there is shown a windshield 10 as it appears from the outside of the automobile 11 in which the windshield is mounted. The windshield 10 is of a conventional laminated glass construction in that it comprises (FIG. 3) two sheets of glass 12 and 13 and a non-brittle plastic interlayer 14 such as polyvinyl butyral resin, interposed therebetween. The windshield 10 of FIG. 1, or a shown in plan in FIG. 2 includes a glare-reducing area 15 which is a neutral shading within the windshield itself and is vignetted or graduated in shade from a deep or dark hue as at 16, along the upper margin of the windshield, which may be opaque, or nearly opaque, to a very light hue as at 17, in the area adjacent the essentially transparent viewing area 18 through which the driver clearly sees the road and approaching traffic. The utility and advantages of the glare-reducing area or band are of course immediately apparent and presently well-known to the motoring public as well as those skilled in the art. Thus, the depth of hue or color, and consequently the glare-reducing properties, are most intense in the upper area of the windshield from which the most glare will come, and lightest in the area where maximum transparency or visibility is required. Stated otherwise, the amount of light reaching the eyes of the driver is gradually increased as he shifts the line of his sight downwardly toward the area where complete visibility is essential and, conversely, the amount of light reaching his eyes will be progressively decreased as he moves the line of his sight upwardly toward the area of potentially greatest glare.

Figure 2:
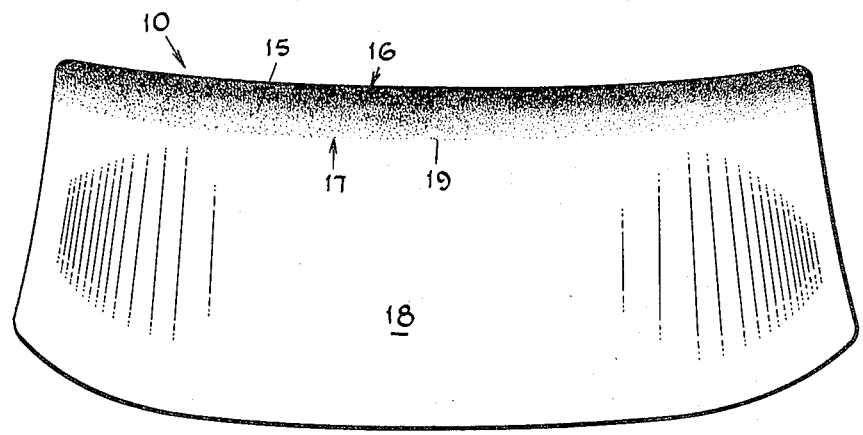
FIG. 2 is a front elevation of the windshield.
Figure 3:
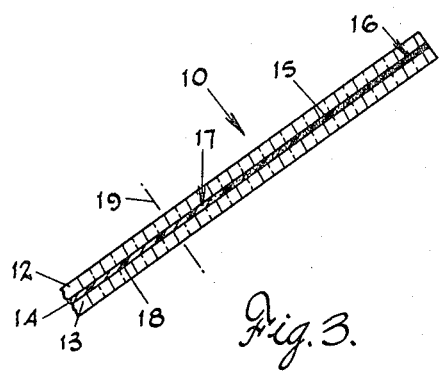
FIG. 3 is a transverse vertical sectional view taken on the line 3—3 of FIG. 2.

It is further known that the lowermost limit or fade-off line of the glare-reducing area or band should be horizontal and substantially parallel to the horizon when the windshield is installed in its functional position in an automobile. Due to the angle at which the windshield is installed and additionally the curvature to which the glass sheets of the windshield were bent before lamination with the plastic interlayer, it has become necessary, in one way or another, to distort or shape the plastic interlayer prior to lamination. The plastic sheeting from which the outline of the interlayer is cut usually is prepared with a band of glare-reducing material, i.e. by dyeing or printing, along and in an area parallel with one of its marginal edges. When shaped, by heating and then cooling, the ultimate interlayer sheet, after lamination with the pair of bent glass sheets, affords a glare-reducing band having a fade-off line 19 substantially as shown in the windshield of FIG. 2. Obviously, the distance of the fade-off line 19 on the interlayer 14 from the upper edges of the glass sheets 12 and 13 is conventionally standardized to conform to known safety regulations. Consequently the width of bands of dyed or printed material on the upper margin of the outline of each plastic sheet before lamination must be entirely uniform.

The shaped effect in this plastic material is attained by the distribution of tractive forces across an unsupported edge of the sheet while it is heat-softened and then maintaining the influence of such tractive forces until the curvature of the shaped sheet is set and it is dried and cooled to substantially room-temperature. As contemplated in the present invention, the heating and cooling of a plurality of plastic sheets is practiced in a substantially "closed" circuit or continuous path whereby each sheet, or a plurality of sheets, in succession are prepared or supported in a suitable frame in one loading area or end of the continuous path and removed from the frame at the opposite end of the path in a closely adjoining area. As well, according to the invention, each sheet, or plurality of sheets, is supplied in the assembly area to the supporting frame and secured therein while being maintained at a predetermined degree of lateral tension.

*General description*

To this end, there is shown in FIG. 10 shaping apparatus, constructed in accordance with the invention, and adapted to automatically carry frame-supported sheets through successive zones of heating and cooling whereby a sheet, or sheets, is shaped according to the method of the invention. The apparatus is constructed to carry out the heating and cooling phases of the shaping operation in a substantially continuous path of movement through which the frame-supported sheets are carried forwardly from an assembly area through the heating area along a lower level and then rearwardly through the cooling area along an upper level. As indicated in FIG. 10, this path of movement of the sheet-supporting frames A is indicated by the arrows, designated by the letters B, C, D and E, and will be seen to proceed forwardly as at B, upwardly as at C, rearwardly at D and downwardly at E.

Generally stated, as the sheet-supporting frames A are moved downwardly, the shaped sheets are removed into the controlled atmosphere of a room F in which the sheets are subsequently assembled between flat or bent sheets of glass preparatory to the final laminating operations. Obviously, the air in room F is substantially purified and closely maintained as to temperature and humidity and one partition or enclosure wall thereof is indicated at G. Suitable openings are provided in such a wall to permit the entry of the frame-supported sheets into the room F and the egress of the empty frames for subsequently successive use in the shaping operation. For this purpose, the apparatus includes a frame return conveyor table H in the lower level of the apparatus from which the frames are manually removed and placed on an assembly and stretching unit J in the assembly area and about which more will be said later.

The assembly unit J thus constitutes the starting area of the path of sheet movement which continues as the frame-supported sheets are moved onto an oven delivery table K and thence into and through the heating oven L on a conveyor system M. As will be more fully hereinafter described, the atmosphere in the entry end of the heating oven is maintained at the highest degree of temperature which is gradually reduced by the entry of relatively cooler and drier air at the exit end of the oven. In this area of the lower level, the frames are successively picked up by an elevator system N, moved upwardly in the direction of arrow C, and delivered to a conveyor system O at the entry end of the cooling tunnel P in the upper level of the apparatus. At the opposite and exit end of tunnel P, the sheet-supporting frames A are successively received on a so-called "lowerator" system R by means of which the frames are delivered through the wall G into the assembly room F and thence removed onto the return table H.

To continuously circulate relatively fresh amounts of dry air at substantially normal room temperature into the cooling tunnel and replenish the warmer air in the heating oven, a circulation system S is herein provided to force air into the cooling tunnel in an area adjacent its exit end and to cause movement of the air around and about the sheets to cool the same while moving oppositely to the direction in which they are carried. In the area of the elevator system N, the air is drawn downwardly into the heating oven L where means is provided for controllably heating and drying the air until it escapes in the vicinity of the delivery table K. Such a system is schematically illustrated in FIGS. 10 and 35.

*Apparatus structure*

With more specific reference now to the structural and operational details of the shaping apparatus, the same will be seen to include a structural framework 20 having vertically disposed columns 21, horizontal longitudinally disposed beams 22 and transverse beams 23. Although the specific details of the enclosing walls of the apparatus form no features of the invention, except as herein noted, the same are constructed of insulating materials arranged as side walls 24 and 25 in the area of the heating oven L, end walls 26 and 27, a horizontally disposed partition 28 between the oven and the cooling tunnel P, and a roof 29.

Above the return conveying table H, the assembly unit J, and the delivery conveying table K, the closure walls for the tunnel P are defined by suitable sheet metal panels 30, 31, 32, 33 and 34, since, in this area of the tunnel, the air is substantially at normal room temperature and such enclosure means is essentially employed to prevent undesired entry of ambient air into the tunnel P before the relatively dry and cool shaped sheets are lowered into the assembly room F. These panels are arranged as side walls 30 and 31, end wall 32, top wall or roof 33 and bottom wall 34.

For reasons to be hereinafter more fully described, the bottom wall 34 is provided with open areas 35 substantially above the assembly and stretching unit J for use by operators of the apparatus. Such open areas can, if desired, be closed by horizontally movable panels 36.

*Sheet supporting frame*

It has heretofore been noted that the plastic sheets are carried in supporting frames A throughout the shaping operation. Such frames are adapted to clampingly engage the marginal edges of the opposite vertically disposed ends of the sheets and maintain the same uniformly taut, in a horizontal direction of tension, while potentially tractive forces are applied to an unsupported or the lower edges of the sheets. As viewed in FIGS. 4 through 9, one type of supporting frame, used to advantage in practicing the method of this invention, includes a relatively lightweight tubular carrier bar 40 and a pair of sheet securing means or members 41 and 42.

Each end of the tubular carrier bar 40 is closed by a plug 43 in which a cylindrical supporting rod 44 is received. Thus, upon reference to FIG. 6, each end plug 43 is fixed in the respective end of the bar 40 by screws 45 while a rod 44 is located in the axial bore 46 and secured by a set-screw 47.

The sheet clamping means or members 41 and 42 are mounted on the carrier bar 40 so as, while in operative use, to hang downwardly therefrom and are arranged in spaced relation according to the required length of plastic sheets to be shaped with such means being constructed to firmly clamp the marginal side edges of the sheets in a positive yet readily releasable manner. In this connection, it will be appreciated that by providing means for adjusting the spaced relation of the clamping members, the supporting frames can be readily adapted to accommodate successive lots or groups of plastic sheets which have lengths determined by the total length of the flat or bent glass sheets with which the distorted plastic sheets are subsequently assembled.

To this end, the sheet clamping or securing means or members 41 and 42 are each formed by a collar 49, clamping arms 50 and 51 attached to said collar and a locking device 52. As herein disclosed, the collar 49 of the tensioning member 41 is fixedly secured adjacent one end of the carrier bar 40 by a bolt 53. On the other hand, the collar 49 of the opposite member 42 is adapted to be adjustably slid along the bar with reference to a plurality of aligned holes 54 in the cylindrical wall thereof. The holes 54 are preferably spaced apart, in increments as of one inch, whereby the distance between respective pairs of clamping arms 50 and 51 of the members 41 and 42 will accurately accord with the required length of the ultimately shaped sheet or sheets. The collar 49 of the clamping member 42 is thus provided with registering and aligned holes 55 for the insertion of a locking key or pin 56 through the collar and the selected holes 54 in the bar 40.

As will be seen in FIGS. 4, 5 and 7, each collar 49 is formed with a U-shaped lug 58 having a web 59 and oppositely disposed walls 60. The arm 50 is also substantially U-shaped in cross section to provide a longitudinally disposed channel or groove 61. This arm is secured at one or its upper end to the inner surface of web 59 by screws 62 while the arm 51 is pivotally carried on a pin 63 supported in walls 60. Each arm 50 at the lower end thereof is equipped with the locking device 52 that is swingably jorunaled on a pin 64 and provided with a handle 65 by means of which the device can be moved into locking engagement with the respective lower end of the arm 51. On its opposite surface, the arm 50 is provided with a locator block 66 having an angled surface 67 which is employed during placement of the frame bodily on the assembly unit J as will be more fully hereinafter described.

As seen in FIGS. 5 and 8, the swingably mounted arm 51 is considerably thinner, in cross section, than the channel 61 in the opposed arm 50 which permits the arm 51 to effectively clamp several superimposed layers or plies of the plastic sheeting within said channel. As indicated in broken line in FIG. 5, the arm 51 is also slightly bowed throughout its length to provide a spring-bias action on the several layers when said arm is engaged by the locking device 52. Each arm 51 carries a rod 68 adjustably mounted by a block 69; said rods being directed inwardly and serving to prevent swaying of the sheets as they are carried by the frames.

As viewed in FIGS. 11, 12 and 13, the unit J is located in the assembly area in which is also situated a roll supply unit, generally designated by the numeral 75, and a feeder unit similarly designated by the numeral 76. These three units are suitably arranged to feed substantially continuous lengths of the plastic material from continuously wound rolls on the supply unit 75 through the feeder unit 76 and to a support frame A on the assembly unit J. This permits selected lengths of the sheeting to be secured to a support frame, in a predetermined condition of lateral tension, while substantially required lengths of the sheeting are drawn from the roll supply unit. As will hereinafter be more fully explained, this allows any non-uniformity of tension in the sheets to be compensated for while the same are temporarily disposed between the supply unit and the assembly unit.

One reason for providing an interval in the feeding operation arises from the fact that several rolls of plastic sheeting may and possibly will possess tension in differing degrees due to normally expected variations in the conditions under which they are initially wound. Consequently when the lengths of sheeting from several rolls are employed, as for the purposes of the present invention, it has been found advantageous to allow the separate lengths of sheeting to relax, due to the inherent elastic memory of the material, and to then be placed more or less in a uniform condition of lateral tension. As herein to be described, one sheet, and preferably as many as six sheets are thus secured at one or their common free ends in a support frame; simultaneously placed in horizontal tension; secured in the opposite end of the frame and then severed or cut from the remaining continuous lengths.

The roll supply unit

As seen in FIGS. 12, 13 and 14, the unit 75 includes a base frame 80 on which is secured vertically disposed pairs of bars 81 and 82. Each pair of transversely aligned bars 81 and 82 is adapted to support the horizontally disposed shafts 83 on each of which a roll 84 of thermoplastic sheeting is rotatably supported. Although forming no specific features of the instant invention, it is to be understood that each shaft 83, as indicated by the numeral 85, is supported at one end in a conventional friction brake type of journal supported between the pair of bars 81 while at the opposite end it is journaled in bearing blocks 86 removably mounted between the respective pairs of bars 82. In this respect, it will be noted that two rolls 84 are arranged in vertically disposed relation between each of the pairs of bars and that, by way of example, provision is made for drawing sheeting from four rolls simultaneously although the supply unit is built to support six rolls when desired.

To maintain substantially continuous operation of the apparatus generally, means is herein provided for removing one unit 75 from a position adjacent the feeder unit 76 and for replacing the one unit 75 by a second unit 75 which carries a plurality of rolls having a further supply of the thermoplastic material. For this purpose, the base frame 80 of the unit 75 is mounted on trucks 87 that are connected to the underside of the frame in angular relation to the longitudinal axis thereof. Each truck 87 supports a shaft 88 at the ends of which flanged wheels 89 are secured. The wheels at each side of the frame, as shown in FIG. 14, are adapted to traverse rails 90, located in or on the floor 91, and, to this end, one of the shafts 88 is operatively driven by a reversible motor unit 92. A second pair of rails 93 is provided in the floor 91 in order that a second roll supply unit 75', as indicated in broken line in FIG. 12, can be moved inwardly toward the feeder unit 76 along the rails 93 subsequent to outward movement of the unit 75 (shown in full line) along the rails 90. While the pairs of rails 90 and 93 are shown as being located in substantially equal angular relation to the longitudinal axis of a supply unit when the same is operatively positioned, it is of course appreciated that the directions of unit movement as determined by location of the pairs of rails can be varied to suit the area within which the apparatus generally is located. The replacement of roll supply units can thus be rapidly effected without undesirable interruption in the supplying of plastic material to the assembly unit J.

The roll supply unit 75 at its end facing the feeder unit 76 is equipped with a series of idler rolls 94, 95 and 96; each of the rolls being journaled at its ends in bearings 97 mounted on brackets 98. In the case of the uppermost rolls of plastic material, the sheeting from each roll is fed over the roll 94 while the sheeting from the lower rolls is trained about the roll 96 and upwardly over the roll 95. It is therefore apparent that the lengths of sheeting material, indicated by the letters a, b, c and d in FIG. 12, between the supply unit 75 and the feeder unit 76, each consists of two layers or plies and that four plies will be simultaneously withdrawn from the four rolls 84 during operation of the said feeder unit. Generally stated, this unit is equipped with a draw roll and an idler support roll which directs the sheeting material to the power rolls of the assembly unit; the draw roll serving to remove predetermined lengths of the material into looped formation between the idler rolls 94 and 95 and the support roll of the feeder unit.

With further reference to mounting of the rolls 84 on the respective shafts 83 of the supply unit, it has hereinabove been mentioned that the fade-off line 19 of each interlayer (FIGS. 2 and 3) is maintained at a definite or standardized distance from the upper edges of the glass sheets with which the interlayer is laminated. It is additionally believed reasonable to assume that, during dyeing or printing of the plastic sheeting to provide the glare-reducing band, the actual distance of the fade-off line from the adjacent edge of the material in continuous sheeting form will vary on one roll of material from that on other rolls. Likewise, the said actual distance will include a sufficient selvage margin to insure a definite width of the glare-reducing band when an outline to agree with the outlines of the glass sheets is cut from the ultimately shaped sheet. For these reasons, as the rolls 84 are mounted on the shafts 83 they are adjusted transversely in one direction or the other, until the fade-off lines, indicated by the numeral 99 in FIG. 13, on the sheets withdrawn from the several rolls will be in substantially exact registration as the sheets are entrained about the idler rolls 94, 95 and 96. Moreover, the rolls are so located, for the purposes of this invention, that, as the several layers or plies of sheeting are supplied to a support frame A on the assembly unit J, the bands of glare-reducing material will be disposed adjacent the carrier bar 40 or will constitute the upper margins of the sheets while they are supported in a vertical plane.

*The feeder unit*

As seen in FIGS. 12 and 13, the feeder unit 76 is fixedly mounted on the floor 91 in suitably spaced relation to the entry end of the assembly unit J. This unit is a substantially rectangular upright structure having vertically disposed end walls 100 supported on a base plate 101. Each end wall is formed by spaced channels 102 and 103 integrally secured at their lower ends to a foot member 104 by similar gusset plates 105 and interconnected at their upper ends by a brace 106. The oppositely disposed webs 107 of the channels 102 and 103 are equipped with flanged bars 108 which form a guide track 109 for the controlled motion of a roll 110 along a vertically directed path of movement. The roll 110 serves as the aforementioned draw roll.

The idler support roll 111 is supported on a shaft 112 journaled at its ends in brackets 113 affixed to the channels 103 as seen in FIGS. 15 and 16. In this connection in FIG. 16, it will be noted that the draw roll 110 is supported for free rotation by means of contained bearings 114 on a shaft 115 which adjacent its ends is equipped with bearing casters 116 adapted to traverse the guide track 109. The ends of the shaft 115 are formed to receive suitable connections 117 for the ends of endless sprocket chain belts 118. Referring now to FIGS. 17 and 18, one of the chain belts 118 will be seen to be entrained over an upper drive sprocket 119 and a lower idler sprocket 120. The sprockets 119 (FIG. 15) are keyed to a shaft 121 carried by journal bearings 122 on brackets 123 on the upper ends of the end walls 100. At one of its ends, the shaft 121 is coupled to a reversible motor unit 124 mounted on the adjacent end wall by a brace 125 while the opposite end of the shaft is adapted to be engaged by a braking device 126. As viewed in FIG. 18, the stub shafts 127 of sprockets 120 at each end of the unit 76 are supported in bearing blocks 128 suitably mounted on the base plate 101.

By control means not specifically shown in detail, the chain belts 118 are caused by the motor unit 124 to lower the draw roll 110 relative to the idler roll 111; the motor unit then being reversed by suitable switch devices to raise the roll 110 to its uppermost position. The distance of downward motion thus determines the length of material drawn from the supply rolls 84 and consequently produces a U-shaped loop in each of the several plies of material between the idler rolls 94 and 95 of the supply unit 75 and the support roll 111 of the feeder unit 76. The above-mentioned braking device 126 becomes active, when the roll 110 reaches its uppermost position, to prevent objectionable rotation of the shaft 121 thereby restraining the roll 110 from any undesired downward sinking action.

*The assembly unit*

This unit, as will be more specifically described in detail, is constructed and equipped to properly locate a support frame with reference to the conveyor systems associated with the actual shaping apparatus; to supply a definite amount or length of the plastic material into proper position relative to the support frame; and to then produce a predetermined degree of tension in the continuous lengths of material after the free ends thereof have been clamped in one of the sheet securing members of the support frame.

Figure 33:
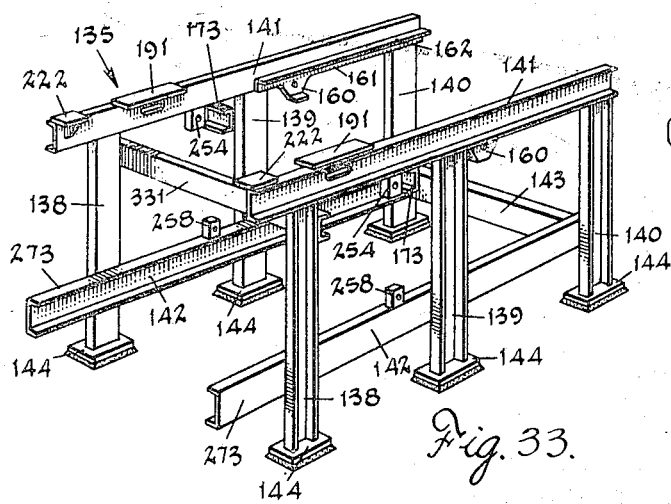
FIG. 33 is a perspective view of the frame structure of the assembly and stretching unit.

More particularly, the unit J includes a base framework 135, a longitudinally movable carriage 136 and a swingably mounted traction roll frame 137. As best illustrated in FIG. 33, the framework is formed by longitudinally spaced and transversely parallel pairs of vertically disposed pedestals 138, 139 and 140, horizontal longitudinal channel members 141, horizontal longitudinal channel members 142 and a horizontal transverse channel chamber 143. The horizontal channel members 141 form the upper side elements of the framework 135 and are integrally fixed to the upper ends of the several pedestals while the channel members 142 are located in downwardly spaced parallel relation to the channels 141 and secured to the inner surfaces of the pedestals with the channel member 143 being secured at its ends between the channel members 142 adjacent the pair of pedestals 140. Each of the pedestals at its lower end is equipped with a base plate 144 by which the framework 135 is bodily supported and secured on the floor 91.

The carriage 136 is adated to be moved endwise between the upper channel members 141 to vary the length of the unit J substantially in agreement with the predetermined distance between the sheet securing members 41 and 42 of a sheet supporting frame A. Generally stated, the framework 135 and carriage 136 are equipped with horizontally disposed planar surfaces forming an extendable table or deck for the unit on which a conveyor belt is adapted to be supported to freely carry lengths of the plastic sheeting as it is drawn from the feeder unit 76.

Figure 28:
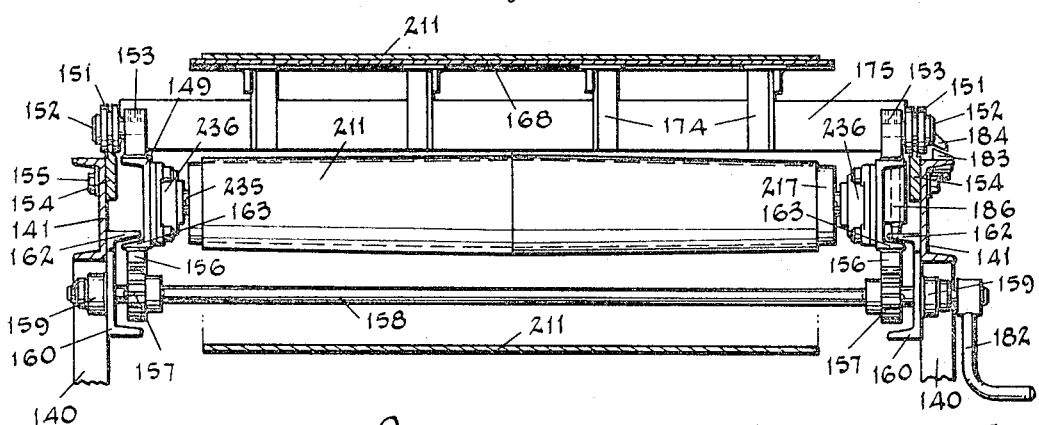
FIG. 28 is a transverse vertical section taken on line 28—28 of FIG. 25.

For these purposes, the carriage 136 includes a chassis or body 148 formed by longitudinal side channels 149 and transverse channels 150. The carriage is bodily mounted on the framework 135 by means of grooved rollers or casters 151 that are arranged in pairs along the sides of the channels 149 and journaled on stub shafts 152 secured in blocks 153 on the upper surfaces of said channels. The grooved rollers are supported on rails 154 secured by bolts 155 to the inner surface of the webs of the frame channels 141 along the upper margins thereof as shown in FIGS. 20, 21 and 28. The carriage is adjustably moved relative to the framework by means of rack gears 156 attached to the bottom legs of the side channels 149 and meshing with pinions 157 carried by a transversely disposed shaft 158. The shaft is journaled adjacent its ends in bearings 159 supported in the downwardly directed lugs 160 of a channel 161 fixed to the lower margins of the frame channels 141. These channels forwardly and rearwardly of the lugs 160 are cut away so as to be substantially flush with the lower surfaces of the channels 141 and to have one or the upper leg 162 disposed slightly above the opposed lower leg 163 of the carriage side members 149. Although the legs 162 and 163 are normally out of contact, it is intended that the fixed legs 162 will be engaged by the legs 163 in the event that the carriage should be inadvertently overbalanced at its free or outer end.

The table surface or deck 165 of the unit J is provided by two fixed and longitudinally spaced panels 166 and 167 of sheet metal or the like and a panel 168 on the carriage 136. As viewed in FIGS. 20 and 24, the panel 166 is supported by a structure 169 including a transversely located base member 170 mounted at its ends on the upper surfaces of the channels 141. Similarly, the dcek panel 167 is supported by a structure 171 including a base member 172 mounted by brackets 173 attached to the lower surfaces of the channels 141. On the other hand, the panel 168 is supported by a structure 174 having transverse base members 175 secured at their ends to the upper surfaces of the side channels 149 of the carriage as in FIGS. 20 and 25. The deck panel 168 will also be seen to be slidable relative to and beneath the adjoining panel 167 and is suitably notched as at 176 (FIG. 20) to avoid interference with the support structure 171.

The opposed marginal edges of deck panels 166 and 167 are spaced apart for the positioning of a locator device, generally designated by the numeral 180, in FIGS. 20 and 24 which is adapted to locate one securing member of a sheet supporting frame while the other securing member is supported on the carriage 136. Since as aforementioned, one of the securing members, such as the member 41, is substantially permanently secured to the tubular bar 40, its relation to the adjacent support rod 44 of the frame A permits use of the member 41 in regard to the locator device 180 to insure subsequent registration with the conveyor systems on which the frames A are carried through the apparatus. The opposite securing member 42, on the other hand, has been said to be adjustably movable along the bar 40 to suit the required lengths of sheeting material. Consequently the carriage 136 is movable inwardly and outwardly to provide suitable support for the securing member 42. This support is afforded by a tray or platform 181 mounted on the outwardly disposed end of the carriage.

To locate the platform so that a securing member 42 can be easily located substantially in its medial area, the carriage is propelled along the rails 154 by rotation of the pinions 157 by a crank 182 at one end of the shaft 158 and with reference to the legends of a lineal scale 183 mounted on a frame channel 141. The desired location of the carriage is determined by a pointer 184 traversing the scale 183 and the carriage secured in this position by a lock pin 185. As shown in FIG. 21, this lock pin is supported for vertically reciprocal motion by a block 186 secured to one side channel 149. The pin is formed with an upper handle position 187 and a lower tapered end 188 is adapted to be selectively inserted in one of a plurality of holes 189 in the upper leg 162 of a channel 161, such holes being preferably spaced apart to accord with the legends of the scale 183.

The locator device 180, as shown in FIGS. 20, 24 and 30, is supported by brackets 190 on mounting plates 191, secured to the upper surfaces of the channels 141, and generally includes a transversely disposed tubular member 192 of square cross-section. An elongated bar 193 (FIG. 27) is mounted on the upper surface of the member 192 in parallel with its vertical longitudinal axis and is provided with a beveled surface 194 at one of its ends against which the beveled surface 67 of a locator block 66 of a frame A, is adapted to be located. The top surface of the bar 193 is spaced beneath the horizontal plane of the deck panels 166 and 167 to support the fixed arm 50 of a securing member 41 substantially level with said panels. To define the width of the locator device and thus form a groove sufficient for reception of arm 50, angularly shaped members 195 are secured along their vertical legs 196 to the sides of the tubular member 192 and with the horizontally disposed legs 197 directed outwardly. Each leg 197 carries a narrow support panel 198, the outer edges of which are spaced from the adjacent edges of the panel 166 or 167 to define open areas 199 for the relatively free movement of a looped portion of a conveyor belt as will shortly be described.

Referring to FIG. 13 wherein the assembly unit J is shown in spaced relation to and between the return conveyor table H and the oven delivery table K, it is to be noted that from the adjacent end of the table H the returned frames A are manually removed by operators, at least two being employed, and properly located on the assembly unit J. After a sheet or plurality of sheets have been assembled and put in a tensioned condition in a support frame, it is moved forwardly by the operators onto the oven delivery table K from which the frame is automatically carried into the oven proper. In this connection, it will also be apparent that the operator in the area of the platform 181 has relative freedom movement during his handling of one end of each support frame while the other operator will be more or less restricted by the continuous lengths of the thermoplastic material from the supply unit 75, through the feeder unit 76 and onto the deck of the assembly unit. Consequently it often becomes necessary for the operator to support the weight of the frame until the immediate end has been carried over the deck of the assembly unit and the securing member 41 suitably positioned on the locator device 180. To relieve this circumstance, a transversely disposed bridge member 200 is provided to support this immediate end of the frame by the rod 44. The bridge member 200, as viewed in FIGS. 20 and 24, is horizontally disposed adjacent to and parallel with the locator device 180 and is formed by a bar 201. This bar is supported at its opposite ends by brackets 202 on the mounting plates 191 at each side of the unit.

Referring now to the platform 181 at the outer end of carriage 136, it will be noted in FIGS. 23 and 25 that the same is mounted on the outer ends of the side channels 149 and includes base members 203 which carry a horizontal, transversely disposed panel 204. The panel is adapted to support the securing member 42 of a frame A and is therefore provided with a horizontal, centrally disposed support area 205, at substantially the same elevation as the upper surface of the bar 193, and is bent downwardly and outwardly as at 206 and 207, to afford end areas 208 and 209 located at a lower elevation but in parallel planes with the central area 205. A block 210 is secured on the end area 208 of the platform in spaced relation to the downwardly bent portion 206 to receive a locator block 66, on the securing member 42 of a support frame, with the angled surface 67 thereof engaging the surface 206, and thereby properly locating the respective end of the frame. When the securing members 41 and 42 are located against the angled surfaces 194 of the bar 193 and 206 of the platform, the tubular carrier bar 40 will be supported on the end area 209 of the platform 181 and the plate 191 in the vicinity of the locator bar 193 as is shown in broken line in FIGS. 13 and 23.

The aforementioned conveyor belt, designated by the numeral 211, is adapted to carry the lengths of the sheeting from the traction-roll unit 137 across the surfaces of the deck panels 166, 167 and 168 until the leading edges of the layers or plies of sheeting are disposed in the medial area of the platform 181 or extended over a securing member 42 thereon. The upper flight of the belt 211 is thus entrained about a roll 212 adjacent the traction-roll unit 137, a roll 213 on the entry side of the locator device 180, downwardly and upwardly about an idler roll 214 to a roll 215, that is axially parallel with the roll 213 and at the exit side of the locator device, and then about an end roll 216 on the carriage 136. Continuing, the lower return flight of the belt from the roll 216 is trained in a reverse loop about roll 217 on said carriage, to a drive roll 218 and beneath a tension roll 219 between the roll 218 and roll 212.

Figure 27:
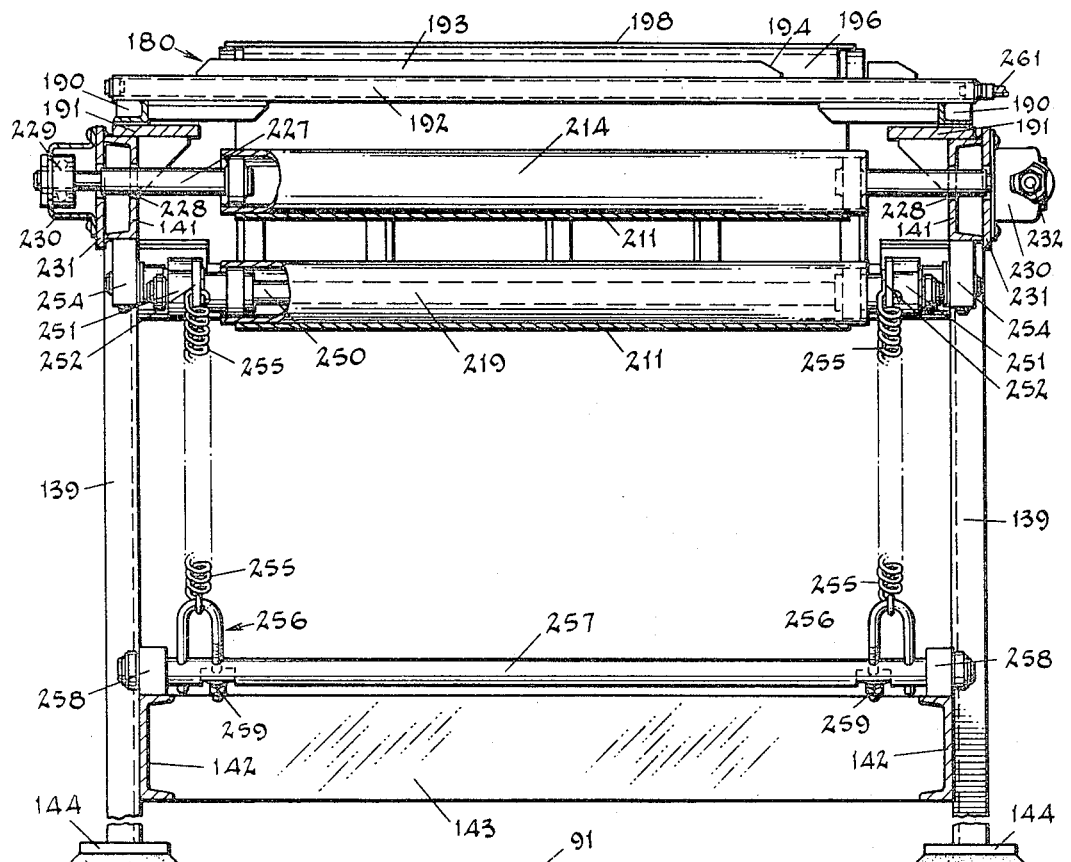
FIG. 27 is a transverse vertical section taken on line 27—27 of FIG. 24.

As viewed in FIGS. 20, 24 and 25, the shaft 220 of roll 212 is journaled at its ends in bearings 221 carried on mounting plates 222 secured to the upper surfaces of the frame channels 141. The shafts 223 and 224 of rolls 213 and 215 respectively are similarly journaled in bearings 225 and 226 on the aforementioned mounting plates 191. The idler roll 214, about which the bight of the conveyor belt is trained, is supported by stub shafts 227 passing through slots 228 in the webs of channels 141 and journaled in adjustably mounted bearings 229 (FIG. 27). The bearings 229 (FIG. 20) on each side of the framework 135, are supported in brackets 230 carried by plates 231 and equipped with adjusting screw devices 232. The shaft 233 of roll 216 is journaled at its ends in bearings 234 secured on the upper surfaces of the carriage side channel members 149 adjacent the platform 181. The take-up roll 217 (FIGS. 25 and 28) is fixedly carried on shaft 235 journaled in bearings 236 mounted on the webs of channels 149 adjacent the forward ends thereof.

The shaft 240 of drive roll 218 is journaled at its ends in bearings 241 secured on the undersurfaces of the channels 141 adjacent the pair of pedestals 140. As shown in FIG. 23, the shaft 240 is equipped with a sprocket 242 which is coupled to a drive sprocket 243, on the output shaft of a motor-driven unit 244, by sprocket chain belt 245. The power unit 244 is supported on a base plate 246 mounted on transverse frame channel 143. A take-up sprocket 247, adjustably mounted on a plate 248 carried by the adjacent pedestal 140, may be conventionally employed to adjust the slack in the sprocket chain belt 245. Generally speaking, operation of the power unit 244 is controlled by one or the other of the operators or other suitable control means, to be more fully hereinafter described, when supplying of the thermoplastic sheeting to the assembly and stretching unit J is required and produced by movement of the conveyor belt 211.

Upon reference now to FIGS. 24 and 27, the tension roll 219 is fixed on a shaft 250 that is journaled at its ends in bearings 251 secured in one end of arms 252. The arms 252 are swingably carried at their opposite ends by a shaft 253 supported at its opposite ends in blocks 254 secured to the undersurfaces of the frame channels 141. Outwardly of the shaft bearings 251, each arm 252 is equipped with an "eye" for receiving an end of a coil spring 255 which at its opposite end is attached to a U-shaped tension adjusting device 256. As seen in FIG. 27, the legs of tension devices pass through suitable holes in a mounting shaft 257 carried at its ends in blocks 258 fixed on the upper surfaces of the frame channels 142. One leg of each device 256 is threaded and equipped beneath the shaft with adjusting nuts 259. Consequently the lower flight of the conveyor belt 211 between rolls 218 and 212 will be influenced by the action of the springs 255 through the roll 219 to maintain the belt in its entirety in a normally desired taut condition. In this connection, it is to be noted that between rolls 212 and 213, the section U of the upper flight of the belt 211 traverses the deck panel 166, and the section V between the rolls 215 and 216 is similarly supported on the panels 167 and 168; this serving to provide a substantially rigid supporting and working surface for the plastic material particularly on the panels 167 and 168. The take-up roll 217 also serves to reduce any slack producible in the reversely looped section of the belt as when the roll 216 on the carriage 136 is moved inwardly or outwardly with reference to the framework 135 and the drive roll 218 carried thereon. The rolls 212, 217 and 218 are also crowned or formed with annular surfaces tapering outwardly from a high centrally disposed area to maintain the conveyor belt from shifting edgewise.

It is believed apparent that before supplying of the sheeting material and after the assembly of sheeting with one support frame and its ultimate removal onto oven delivery table K, the free or severed ends of the material will be more or less supported on the panels 198 adjacent the groove area above the locator device 180. Now, unless means is provided for supporting these free ends as they are advanced over said area and onto the section V of the conveyor belt during initial forward movement of the sheeting, the ends would objectionably fall into the groove and cause undesired halting of such movement of the material with the adjoining section of the belt or from the section U to the section V. To guard against this possibility, the upper wall of the tubular member 192 is provided with parallel rows of holes 260 (FIG. 30) to produce air jets by means of air under pressure within the tubular member and as supplied from a pipe 261 (FIG. 27) connected to one of its ends. The jets of air produce an air blanket to thus float the ends of the material from one section of the conveyor belt to the next section without manual intervention.

As earlier explained, the several layers from the rolls 184 on the supply unit 75 are drawn therefrom during operation of the feeder unit and permitted to relax in freely supported loops or "festooned" condition between the rolls 94 and 95 of the unit 75 and the roll 111 of the feeder unit 76. The layers or plies of sheeting are thus trained over the support roll 111 and directed toward the assembly unit J (FIG. 12) onto which the continuous lengths of the sheeting layers are fed by traction rolls carried by the aforementioned roll support frame 137.

More particularly, a frame 270 for the roll support unit 137 is mounted, at the end of the unit J facing the feeder unit 76, for pivotal movements about the horizontally disposed axis of a shaft 271 journaled adjacent its ends in bearings 272 mounted on the extended ends 273 of the frame channels 142. The frame 270 includes vertically disposed side channel members 274 having inwardly disposed webs 275, a horizontal top channel member 276 with an upwardly disposed web 277 and horizontal transverse channel members 278 secured by their webs to the outwardly facing legs of the side channels 274. The frame 270 is carried on the shaft 271 by means of blocks or collars 279 secured to the outwardly directed surfaces of the webs 275 adjacent their lower ends and equipped with set screws 280 for securing the respective ends of the shaft therein.

Generally speaking, the frame 270 is adapted to support traction or feed rolls for supplying plastic sheeting from the feeder unit 76; to mount the source of power for driving the traction rolls; to be connected to the framework 135 for pivotal movement and also to be connected to a limiting device whereby the distance of pivotal movement is automatically controlled. As viewed in FIGS. 22 and 24, a pair of feed rolls 282 and 283 are located adjacent the upper end of the frame 270 and with the lower roll 282 adapted to be driven about a substantially fixed horizontal axis while the upper roll 283 is adapted to be urged by controlled spring pressure into rolling contact with the roll 282 or the layers of sheeting which are to be drawn therebetween. Both of the rolls are of tubular cross-section provided with an outer annular layer of rubber (FIG. 24) to provide resilient traction surfaces for substantially positive pulling or feeding of the sheeting from the feeder unit 76. For this purpose, the roll 282 is mounted by stub shafts 284 which are journaled in bearings 285 secured to the inner surfaces of the webs 275; one of said shafts 284 being equipped with a sprocket 286. The roll 283 is mounted by stub shafts 287 the ends of which are journaled in trunnion blocks 288 about which more will be said later. The rolls 282 and 283 are operatively driven at substantially the same rate of speed by means of spur gears 289 that are mounted on the respective shafts 284 and 287, as in FIG. 22.

Figure 26:
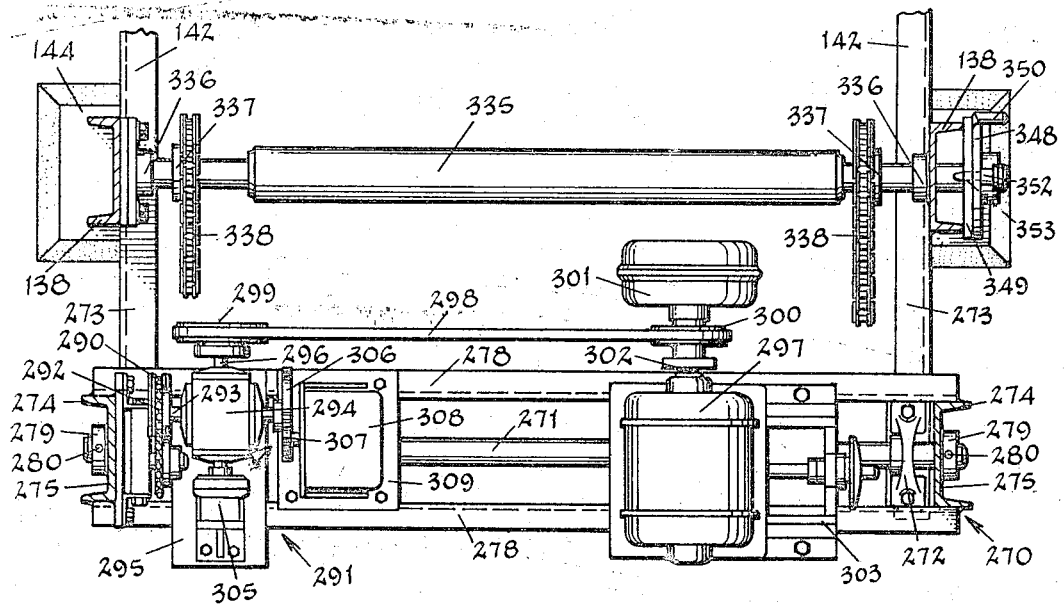
FIG. 26 is a horizontal section taken on line 26—26 of FIG. 22.

The sprocket 286 is coupled by sprocket chain belt 290 to a source of power, generally designated by the numeral 291 and best illustrated in FIG. 26. The chain belt 290 will herein be seen to be trained about a drive sprocket 292 on the output shaft 293 of a gear reduction unit 294 which is mounted on a plate 295 supported by the transverse channel members 278. The input shaft 296 of this unit is driven from a motor 297 through a belt 298 entrained about the sheave 299 on shaft 296 and a second sheave 300 carried by a centrifugal action clutch 301 which in turn is mounted on the motor shaft 302; the motor 297 being mounted by an adjusting bracket 303 on plate 304 supported by transverse channels 278. The input shaft 296 projects outwardly through the casing of unit 294 and is thence connected to an electromagnetic brake 305. The shaft 293 likewise projects from the unit 294 and on the extension thereof mounts a spur gear 306. This gear is meshed with a pinion 307 adapted to drive a linear gaging device 308 mounted by plate 309 on channels 278.

The device 308 is adjustable to determine the number of revolutions of the traction rolls 282 and 283 thereby controlling the lineal lengths of the thermoplastic material to be supplied to the assembly unit or for use with a support frame A located thereon. Consequently, when the ultimate length required for the individual sheet or sheets has been determined, the clamping member 42 of the support frames A is initially moved toward, or away from, the fixed clamping member 41. The carriage 136 of the assembly unit J is then adjusted inwardly or outwardly relative to the scale 183 and control by the device 308 is similarly altered to shorten or lengthen the supplied lengths of material. Thus when the motor 297 is energized and the brake 305 automatically disengaged, the centrifugal clutch 301 will operate when the desired revolutions per minute is reached to drive the unit 294 through the belt 298. In turn, the gear unit 294 will operate to drive the traction rolls 282 and 283 through chain belt 290 and the spur gears 289. Simultaneously, the gear unit operates the gaging device 308 through the spur gears 306 and 307. In this connection, it is believed apparent that the device 308 is provided with suitable electrical control devices whereby it is adapted to halt operation of the motor 297 and re-engage the brake 305 as well as to simultaneously halt operation of the power unit 244 for the conveyor belt 211.

The feed roll 283 is adapted to be urged downwardly toward the roll 282 by springs acting upon the trunnion blocks 288 in which the stub shafts 287 of the roll 283 are journaled. As shown in FIG. 29, each block 288 is provided in its opposite side surfaces with grooves 312 in which keeper plates 313, bolted to the adjoining channel webs 275, are received. In their upper end, each block 288 is formed to receive the fixed collar on an upwardly directed threaded rod 314. The rod passes through an externally threaded bearing sleeve 315 and at its upper end is equipped with adjusting and locking nuts 316. The sleeve 315 is received in the threaded bore 317 of a bar 318 secured to the undersurface of the top web 277 and the legs of the channel 276. A spring 319, in each instance, is interposed between washers 320; one washer resting on the upper surface of the related trunnion block 288 and the other washer bearing against the lower end of the sleeve 315. Thus, by adjustment of the nuts 316 on threaded rods 314, the resilient downward pressure of the springs 319 to urge the roll 283 into contact with the roll 282 can be accurately determined while the compressive energy of the springs can be varied by inner or outward movement of the threaded sleeve 315 relative to the bar 318. A lock nut 321 is employed to secure each sleeve in its adjusted position. The pressure exerted by the roll 283 not only affords a traction force to cooperate with the roll 282 in drawing or feeding the plastic sheeting onto the conveyor belt 211 but also serves, when inactive, to provide a form of pinching pressure to firmly grip the several layers of the material when a lateral tension is to be developed therein. This is of course carried out when the extreme free ends of the sheeting layers have been positively clamped in the securing member 42 of a support frame A.

As above stated, the roll support unit 137 is adapted to be pivotally swung to produce a tensed condition in the layers or plies of plastic sheeting and the distance of such swinging motion is determined by the length of the several layers and the degree of tension or stretch to be developed therein. By way of example, the frame 270 is shown in full line in FIG. 24 in one or its normally idle position and in a broken line position to which it may be pivoted. As the frame approaches the illustrated broken line position, it is resiliently restrained from further movement which function acts to reduce over-stretching of the material. For these purposes, the unit 137 is hydraulically connected to the framework 135 by a piston and cylinder arrangement.

The head 325 of piston 326 is supported by a clevis bracket 327 on a horizontal brace member 328 secured at its ends to the outwardly directed legs of the side channels 274. The cylinder 329 is supported at its head end on a similar clevis bracket 330 mounted on a brace member 331 affixed to the pair of pedestals 138. The cylinder is connected to a controlled source of pressure through conduits 332 and 333; said pressure source being actuated by an operator during a suitable interval in the assembly operation.

Figures 31, 32:
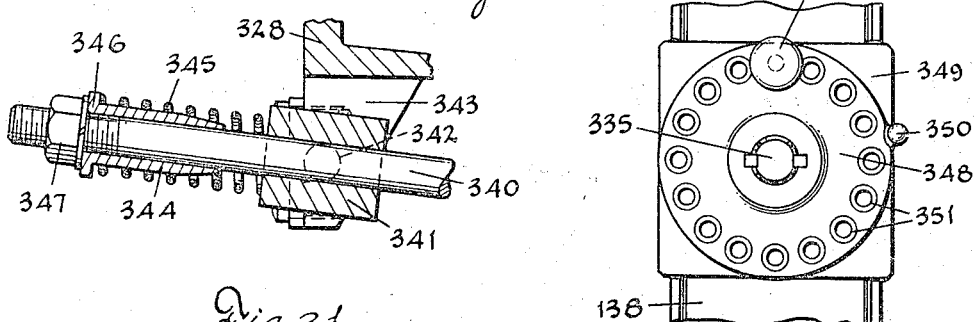
FIG. 31 is an enlarged detail view taken on line 31—31 of FIG. 20.
FIG. 32 is a fragmentary elevation of a tension control device.

The means for resiliently restricting pivotal movement of the frame 270 generally includes a shaft 335 journaled at its ends in bearings 336 mounted on inner surfaces of the webs of pedestals 138 and a pair of sprockets 337 secured by keys on the shaft. Each sprocket is provided with a flexible connection, such as with a length of sprocket chain 338, which is attached at one end to said sprocket by a fastening pin 339; trained thereabout and connected at its opposite end to a spring-biased threaded rod 340. As viewed in FIGS. 24 and 31, the rods are each slidably supported in an associated block 341 having trunnion supports 342 that are pivotally mounted in brackets 343 secured to the brace member 328. Outwardly of the block 341, the rods carry a flanged sleeve 344 with a spring 345 being located between the flange 346 thereof and the opposed face of the block 341. By means of a nut 347 on the threaded outer end of the rod 340, the compression of the spring, in each instance, can be varied.

Referring again to FIG. 24, it will be noted that the chains 338, as in the full line position, hang loosely between the related sprocket 337 and rod 340. However, when the frame 270 is pivoted by the action of cylinder 329 to the illustrated broken line position, the hanging lengths of chain are rendered taut as also shown in broken line. And, before the cylinder is disconnected from the source of pressure, any further motion of the frame is actively resisted by the adjusted compressibility of the springs 345. Consequently, when the required lengths of plastic material and the degree of tension have been determined, the actual distance that the frame 270 is pivoted is established by the lengths of relatively free chain between the sprockets 337 and rods 340. This is achieved by rotation of the shaft 335 by means of a dial plate 348 fixed to one end of the shaft and bearing against a registry plate 349 carried by the adjacent pedestal 138. The dial plate 348 (FIG. 32) is provided with a handle 350 by means of which the shaft 335 is rotated until said plate is suitably located by means of a selected one of a plurality of radially spaced holes 351. A handled pin 352 is then passed through the immediate hole 351 and its inner tapered end inserted into a registering hole 353 in the plate 349 (FIG. 26). In consequence, counterclockwise rotation of the shaft 335 will turn the associated sprockets 337 to lengthen the freely hanging portions of the chains 338 and, conversely, clockwise rotation of the dial plate and shaft will shorten the lengths of the chains to reduce the distance of pivotal movement of the frame 270.

In order to adjust the assembly and stretching unit J to accommodate desired lengths of the thermoplastic sheeting material in accordance with the distance between the securing members 41 and 42 of a sheet support frame A, it is therefore necessary to move the carriage 136 inwardly or outwardly with reference to the framework 135 and specifically with regard to the position of the pointer 184 above the scale 183; to adjust the operative control by the gaging device 308 over operation of the motor 297 and, finally, to increase or reduce the effective lengths of the chains 338 by rotation of the dial plate 348.

Briefly reviewing the structure and use of the roll supply unit 75, feeder unit 76 and the assembly and stretching unit J, reference is again made to FIGS. 11, 12 and 13. It will be noted in FIG. 11 that the unit J is located in suitably spaced relation between the return conveyor table H and the oven delivery table K to permit substantially unrestricted movement of production personnel along both sides of the unit. In this connection in FIG. 11 it will be seen that the operators while standing on platforms 355 have a convenience of "head-room" beneath the bottom wall 34 of the cooling tunnel P. Accordingly, with operators working adjacent the respective ends of the assembly unit, and as a support frame A arrives at the exit end of the return conveyor table H (FIG. 13), it is manually removed therefrom and placed on the unit J with the secured member 41 in the groove of locator device 180 and the opposite member 42 on the platform 181.

When the swingable arm 51 of each securing member is moved away from the associated channel arm 50, the arms 51 can be temporarily supported by a hook 356 (FIG. 12) supported on the framework 20 of the apparatus. This permits an operator freedom of both hands during assembly of the sheeting material on a support frame A. The feed rolls 282 and 283 are then driven to withdraw the looped portions of the layers or plies of thermoplastic sheeting over the idler roll 111 of the feeder unit 76 and to advance the several layers onto the moving conveyor belt 211 until their free ends extend over the securing member 42. These free ends of the sheeting are then clamped by the arm 51 in the channeled arm 50 of the securing member 42.

In this manner, continuous lengths of the sheeting are placed in superimposed relation with the colored bands along one longitudinal edge in exact registration with one another. Upon clamping of the free ends of the plurality of sheets, the roll frame 137 is caused to swing outwardly thereby placing the lengths of sheets between the clamped ends thereof and the traction or feed rolls 282 and 283 in a uniformly stretched or taut condition. While the sheets are maintained in this stretched relation, the arm 51 of the member 41 is employed to securely clamp the plastic sheeting within the related channel arm 50; said arm 51 then being secured by the locking device 52. The plurality of sheets within the frame A are then severed along the outer side of the securing member 41 from their continuous lengths between the traction rolls and said frame. This ensures that each plurality of plastic sheets when clamped in a supporting frame will possess a substantially uniform degree of tautness and that this uniformity of tautness will repeatedly be obtained during the clamping of a plurality of lengths of the sheeting in successive support frames.

Upon completion of the assembly operation, the members 41 and 42 of the frame A are raised and employed to move the frame over onto the oven delivery table K. In this respect, it will be seen in FIG. 13 that one operator can, if necessary, move about the "far" end of the unit J in the vicinity of the platform 181 for this purpose while the other operator is restricted from similar movements by the continuous lengths of material between the feeder unit 76 and the assembly unit J. In consequence, a support rail 375 is provided between the table K and the adjacent side of the unit J.

The oven delivery table

As viewed in FIG. 11, it will be noted that the entry end of the table K is positioned outwardly of the oven structure while the exit end is located within the oven to deliver the sheet supporting frames therein with a minimum loss of heat. The end wall 26 of the oven L is therefore fitted around the framework of the table K and is provided with an elongated horizontally disposed slot 376 for reception of the frames as they are moved across the top surface of the table.

Generally speaking, the framework 380 of the table includes upper longitudinally disposed horizontal side channel members 381 carried by pedestals 382, lower side channels 383 and transverse channel members 384. An upper table surface is provided by a panel 385 carried by the channel members 381. This table panel also has a downwardly and forwardly directed tray portion 386 located within the oven L. At the entry end of the table panel 385 and adjacent the sides thereof, rails 387 are provided to receive the support bars 44 of a frame A, as it is moved bodily onto the table K and to then lower the bars onto conveyor chains whereby the frame will be moved forwardly into the heating oven.

For this purpose, conveyor chain belts 390 are arranged along the sides of the table K and are conventionally formed, as seen in FIG. 19, of links 391 alternately provided with vertical lugs 392 and horizontal outwardly directed lugs 393 and supported by rollers 394 on tracks 395. Along each side of the table K, the endless loop of a chain belt 390 is trained about an idler sprocket 396 supported on frame 380 by bearing 397; a tensioning sprocket 398 on adjusting bracket 399 and a driving sprocket 400 fixed on a common shaft 401 journaled adjacent its ends in bearings 402 on the upper side channel members 381. The upper flights of the chain belts 390 are supported on tracks 395 and continue forwardly into the oven L wherein they are trained about sprockets 403 (FIG. 13) and return rearwardly in their lower flights over supporting sprockets 404 to the associated idler sprocket 396. Each sprocket 403 is mounted on a shaft 405 which also supports an independently operable sprocket 406. The outer end of each shaft 405 is journaled in bearings 407 mounted on suitable portions of the framework 20.

As seen in FIG. 13, the sprockets 406 are located inwardly with respect to each of the adjacent sprockets 403 in order that the sheet support frames A by the rods 44 can be carried forwardly on the conveyor chain belts 390 to the vicinity of the sprockets 403; then be received on similar chain belts, trained about the sprockets 406 and comprising the conveyor system M, and thus be readily and automatically transferred from the oven delivery table K for movement through the interior of the oven L. In this connection, it will be seen in FIGS. 11 and 13 that as the support rods 44 of each frame A are engaged by the vertical lugs 392 of conveyor chain belts 390, the securing members 41 and 42 with the thermoplastic sheeting mounted therebetween will be moved horizontally across the table panel 385 as indicated in broken line. Also, as the frames enter the heating oven, through the slot 376, the securing members 41 and 42 travel downwardly on the tray portion 386 to reduce objectionable swinging of the frames as they move toward and into a substantially vertical plane such as is shown in full line.

The conveyor chain belts 390 can be and preferably are operated at a different rate of speed than the chains of the aforementioned conveyor system M. This is both convenient and preferable since the sheet supporting frames can be delivered into the oven L at a substantially rapid rate of movement while the operation of the conveyor system M is independently controlled to suit the time cycle of the actual heating phase of the distorting operation. The chain belts 390 are thus driven from a source of power 410 by sprocket chain belt 411 trained about the drive sprocket 412 and a sprocket 413 mounted on one end of the shaft 401, FIGS. 11 and 13. By way of example, the conveyor chain belts 390 can be operated at a speed of 250 i.p.m. (inches per minute) while the chains of the conveyor system M operate at selected ranges of speed between 30 to 60 i.p.m. by a source of power as will be shortly described.

Figure 39:
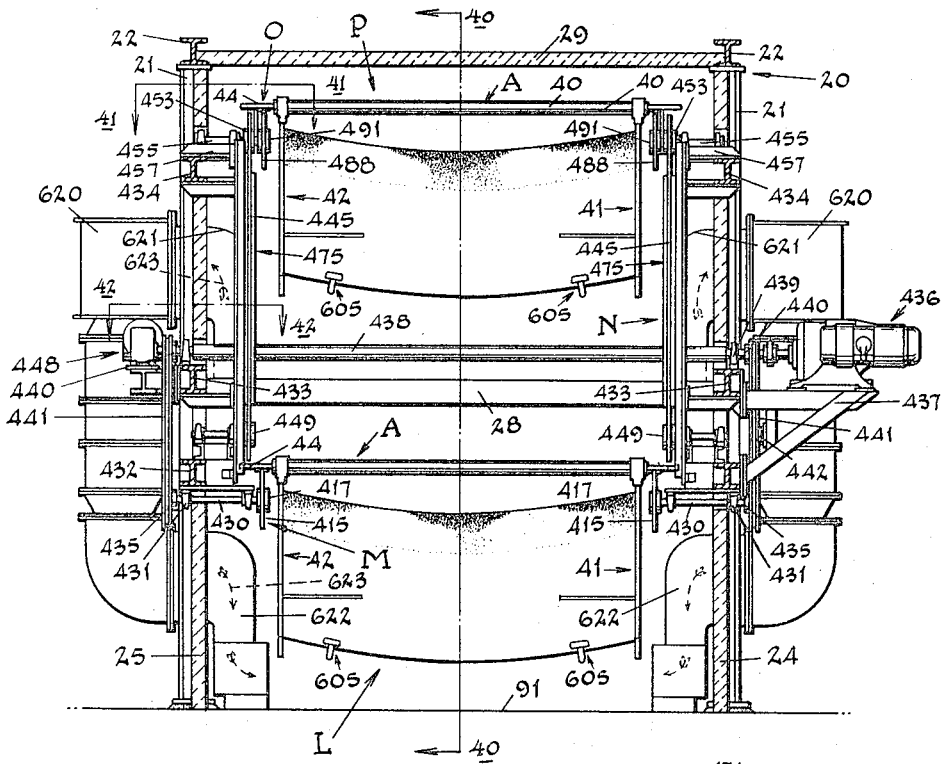
FIG. 39 is a transverse vertical section of one transfer area of the apparatus as taken on line 39—39 of FIG. 10.

Within the heating oven L, the conveyor chain belts 415 of the system M traverse tracks 416 between the sprockets 406 in the entry end of the oven and similar sprockets 417 adjacent the aforementioned elevator system N (FIGS. 39 and 40). The previously described tracks 395, in FIG. 19, as well as the tracks 416, are formed by and supported on beams 418 that are equipped on their upper surface with spaced rails 419 and a strip 420 of hardened metal, such as stainless steel, to reduce wearing of the track surfaces as well as the rollers of the respective conveyor chains.

It is of course highly desired that assembly of the plastic sheets with a support frame A be efficiently carried out and the frames then delivered into the heating oven L in substantially regularly spaced order. It is, however, realized that certain factors, such as the rate at which the frames are returned to the area of the assembly unit J and unavoidable delays in the actual assembly, can vary the spacing between the frames as they are delivered into the oven and passed from the chain belts 390 to conveyor belts 415 of the conveyor system M.

In order that the frames A will be suitably spaced along the conveyor system M and also insure that each frame is located in proper transverse relation to the chain belts 415, means is herein provided to automatically interrupt forward movement of each frame until a preceding frame has advanced a predetermined distance therebeyond. In succession, each preceding frame is adapted to release the next frame which in then resuming its movement causes the next subsequent frame to be similarly temporarily halted. In this way, the frames are delivered to the elevator system N in substantially regularly spaced order and with the support rods 44 of each frame axially aligned in transverse relation to the chain belts 415.

As viewed in FIGS. 35 and 36, a latching arrangement including a stop-bar 421, a first switch 422 and second switch 423 is provided on each of the tracks 416. As above-mentioned, the regularity of timing in which a frame will be delivered from the chain belts 390 onto the chain belts 415 is variable with the result that the stop-bars are sufficiently spaced from the sprockets 406 for several frames to be received on the belts 415 in somewhat irregularly spaced order before movement of each frame, in succession, is temporarily interrupted. More particularly, the stop-bars 421 are each raised by a solenoid device 424 and lowered by a related coil spring 425. The solenoid devices 424 are thus adapted to be energized by switches 422, when the levers 422a thereof are engaged substantially immediately after a frame is released to permit its forward movement, to raise the stop-bars into the path of a subsequent frame. The switches 423 are located along the tracks 416 at a predetermined distance from the stop-bars 421 so that each preceding frame will successively engage the levers 423a of said switches to de-energize the solenoid devices thereby enabling the coil springs to lower the stop-bars 421 until the subsequent frame has passed thereover. The limit of downward movement of the stop-bars is controlled by cross pins 426 as seen in FIGS. 37 and 38.

It is also apparent that manual switches can be interposed in the circuits controlled by switches 422 and 423 to obtain the desired spacing between the initial number of frames A entering the heating oven, such as at the beginning of an operative cycle.

Figure 45:
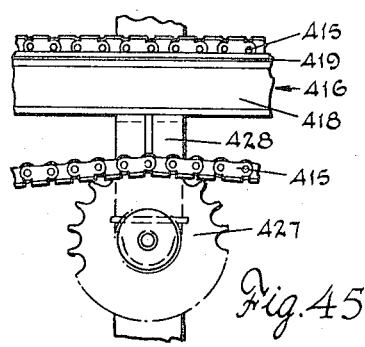
FIG. 45 is a detail view of a part of the conveyor systems.

At suitably spaced points within the heating oven L, the return flights of the chain belts 415 are supported, to prevent undue slack, on idler sprockets 427 carried on brackets 428 secured to columns 21 and which on their upper surfaces serve to mount the tracks 416 as viewed in FIG. 45.

Referring now to FIG. 40, the exit end of each track 416 is supported by a bracket 429 mounted on adjacent columns 21 of the general framework 20. In this figure, one of the pair of conveyor chain belts of the elevator system N is illustrated as well as the entry end of the conveyor system O, extending through the cooling tunnel P. As herein shown, the chain belts 415 are each trained about a sprocket 417; each sprocket being keyed to a shaft 430 journaled in associated pairs of bearings 431. The bearings 431, as well as the bearings for mounting the respective shafts of the conveyor systems N and O, are mounted on horizontally disposed and vertically parallel beams 432, 433 and 434 secured at their ends to adjacent columns 21 with reference being hereinafter made individually to the beams 433 and 434. Each shaft 430 is projected outwardly of the oven wall and at the end opposite the sprocket 417 mounts a multiple-width driven sprocket 435. The sprockets 435 (FIG. 39) are driven from a common source of power 436, supported by a structure or platform 437 on one side of the framework 20, and by means of a shaft 438. The shaft 438 is journaled in bearings 439 on beams 433 and outwardly thereof at its opposite ends supports multiple-width drive sprockets 440. The sprocket chain belts 441, trained about the pairs of sprockets 435 and 440, can be adjusted to reduce slack by means of idler sprockets 442. In FIG. 40, it will be noted that the transversely disposed shaft 438 is located within the loops formed by the conveyor chains 445 of the elevator system N.

*The elevator system*

The chain belts 445 are each entrained by sprockets which are arranged to form an upwardly directed vertical flight 446 and a downward return flight 447 and are operatively driven from source of power 448. To this end, the lower looped end of each chain belt 445 is trained about a related sprocket 449 mounted on a shaft 450 journaled in bearings 451 supported on beam 432 by a bracket 452. The upper looped end of each chain belt 445 (FIG. 41) is trained about a sprocket 453 freely rotatable by sleeve bearing 454 on related shaft 455 journaled in bearings 456 on a bracket 457 carried on a beam 434. The return flight 447 of each chain belt is further trained over a sprocket 458; both sprockets 458 being keyed to a transversely disposed drive shaft 459. The shaft adjacent its ends is journaled in bearings 460 which are similarly mounted for adjustment on brackets 461, equipped with screws 462, on beams 433. One end of shaft 459 (FIGS. 39 and 40) is coupled to the source of power 448, the control for which will be hereinafter more fully explained.

Figure 42:
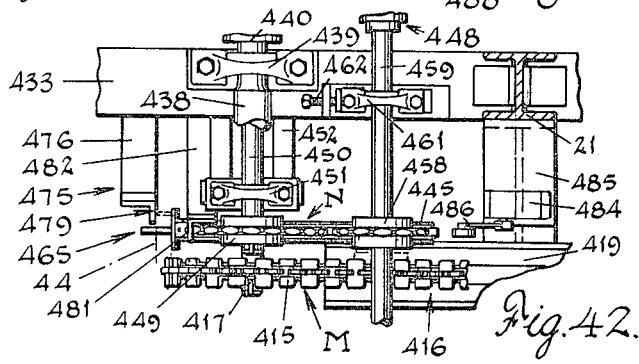
FIG. 42 is a horizontal section taken on line 42—42 of FIG. 39.
Figure 44:
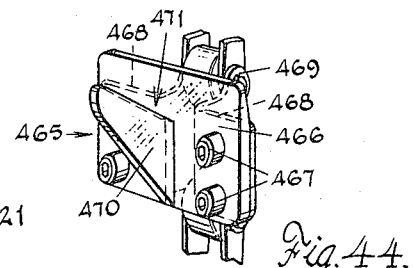
FIG. 44 is a perspective view of a conveyor chain support member.

With further reference to FIG. 40, it will be seen that the lower looped ends of the chain belts 445 are spaced above the conveyor chain belts 415 of the system M for the support rods 44 of a sheet supporting frame A to pass freely therebetween. As previously mentioned in connection with the conveyor chain belts 390 and 415, the support rods 44 are automatically transferred from one conveyor system to another by the spaced relation of the respective supporting sprockets. In the present instance, the chain belts 445 are located in outwardly spaced relation to the chains 420 (FIG. 42). Consequently as a frame A is advanced into the active area of the elevator system N, the end support rods 44 are adapted to be conveniently removed from their supported relation on the chain belts 415 of the conveyor system M and engaged adjacent their outer ends by the chain belts 445, as in FIGS. 39 and 42, to effect transfer of the related frame A onto the elevator whereby it is moved upwardly for ultimate removal onto the conveyor system O. For this purpose, each chain belt 445 is equipped with supporting members 465 which are secured in substantially equally spaced relation about the associated chain belt. As seen in FIG. 44, such support members include a plate 466 secured by bolts 467 to the outwardly bent lugs 468 of a chain link 469. Each plate has an outwardly directed, vertically disposed lug 470 in its medial area which is formed to provide a notch 471 in which a support rod 44 will be received.

Intermittent operative movement of the chain belts 445 is controlled by means responsive to the advancing movements of the frames to produce sequentially spaced intervals of operation of the power source 448 whereby a frame is removed from the conveyor system M; raised vertically a predetermined distance and subsequently lifted for transfer onto the conveyor system O. Such responsive means is provided in one instance by limit switches 472 carried by each of the tracks 416 adjacent their exit ends. As seen in FIG. 40, these switches are equipped with actuating levers 473 which are adapted to be engaged and depressed by the oppositely disposed rods 44 of a sheet support frame. The switches are preferably so positioned that both of the levers 473 must be engaged to complete an electric circuit through the switches 472 before operation of the power source 448 will be initiated. In other words, the support rods 44 must be transversely aligned in the vicinity of the sprockets 417 before the power 448 will be activated and a frame A can be bodily and horizontally removed by the support members 465 on the chain belts 445.

To insure positive upward motion of the frames, provision is herein made to direct the rods into the aforementioned notches 471 of the support members 465 and maintain this supported relation during such upward movement. For this purpose, a pair of guide rails are employed to engage the rods 44 and likewise the rollers 474 of the chains 445. In this respect, a guide rail 475 is supported by brackets 476 on the several beams 432, 433 and 434. Each rail includes a lower arcuately formed section 477 and a vertically disposed upper section 478. The leg surface 479 of each rail 475 is thus freely engageable with a support rod 44 which relation is maintained by the leg surface 480 of a guide rail 481 that is traversed by the chain rollers 474, as in FIGS. 40 and 42. The guide rails 481 are similarly mounted by brackets 482 on the aforementioned beams.

According to a preferred mode of operation, the elevator N is operated to move a frame A upwardly to a position substantially as shown in broken line in FIG. 40 and said operation then halted by the actuation of means responsive to the downward movement of a support member in the return flight 447 of the related chain belt. Thus, a limit switch 484 is supported by bracket 485 on an adjacent column 21. To this end, the lever 486 of switch 484 is adapted to be engaged by the lug 470 of a downwardly moving support member 465 with the timed cessation of operation of the power source occurring substantially as others of the support members 465 arrive at positions substantially as shown in FIG. 40. In one way or another, the switch 484 is interlocked with the limit switches 472 into the electric control system of the power source 448 as is believed readily apparent. In this connection, it may also here be noted that while the chain belts 415 of the oven conveyor system M are, as previously stated, driven at a speed of substantially 60 i.p.m., the power source 448 is adjusted to operate the chain belts 445 at an accelerated speed of substantially 600 i.p.m. (inches per minute) or within a preferred range of 300 to 600 i.p.m.

When the chain belts 445 are intermittently operated upon closure of both of the limit switches 472, the support members 465 located in the return flights 447 will be carried downwardly and about the sprockets 449 to engage a sheet support frame A by the support rods 44 which are then located at the entry ends of the curved lower sections 477 of the guide rails 475. Simultaneously, the frame A at a medial elevation between the sprockets 449 and 453 and temporarily supported in engagement with the vertical rail sections 478 will be carried upwardly and about the sprockets 453. To effect separation of the frame support rods 44 from the support members 465, plates 487 are positioned between each of the chain belts 445 and 488 of the conveyor system O, where said plates are mounted by similar brackets 489 on the beams 434. Each plate 487 is provided on its upper edge with a downwardly angled surface 490 on which the rods 44 will be received and moved outwardly from the notches 471 of the respective support members. The angled planes of the surfaces 490 are adapted to co-act with the inner surfaces of the lugs 470 to produce, as shown in FIG. 43, a form of scissor action by which the rods are urged forwardly onto the chain belts 488 of the conveyor system O.

Figure 41:
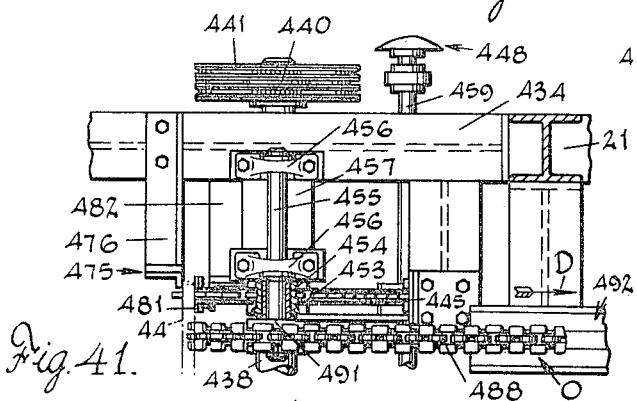
FIG. 41 is a horizontal section taken on line 41—41 of FIG. 39.

As each sheet support frame A is carried over the upper sprockets 453 and the rods 44 are received on the surfaces 490 of the plates 487, the frame is transferred onto the pair of chain belts 488 of the conveyor system O entering and traversing the cooling tunnel P. The chain belts 488, in each instance, are trained about associated sprockets 491, which as viewed in FIGS. 39 and 41, are keyed on the shafts 455 at their inwardly disposed ends. As previously described, the shafts are journaled in bearings 456 and also mount a sprocket 453 for independent rotation on an associated sleeve bearing 454.

The chain belts 488, forming the conveyor system O, are caused to move in their upper flights in the direction of the arrow D into the cooling tunnel P wherein they traverse the tracks 492 that are constructed in the same manner as the aforementioned tracks 395 and 416. The tracks 492 are adapted to support the chain belts 488 to the exit end of the cooling tunnel adjoining the lowerator system R on which the frames A are successively moved downwardly into the room F. Generally stated, the chain belts 488 in this exit area are trained about sprockets 493 and pass into their lower return flights which are supported on suitably spaced idler sprockets 427, as illustrated in FIGS. 11 and 45 previously described in connection with the chain belts 415.

*The lowerator system*

Broadly described, the lowerator system R is, as aforementioned, vertically located between the exit end of the cooling tunnel P and the conveyor system O therein and the return conveyor table H to receive the frames A, supporting substantially cool and dried shaped sheets of the plastic material, and to deliver the same into the conditioned room F. In so doing, operation of the lowerator system is controlled to successively receive the frames A and to lower each frame to a position above the table H, at which position the sheets are removed from the frame. Upon entry of a successive frame into the transfer area between the conveyor systems O and R, the then empty frame is further lowered until it is received on the table H and thus carried to a position from which it can be manually removed for ultimate assembly with new lengths of sheeting on the assembly and stretching unit J.

To this end, the lowerator system R, as viewed in FIGS. 11 and 46, is located with its uppermost end within the exit end of the cooling tunnel P and to some extent enclosed by the side walls 30 and 31, the end wall 32 and roof 33 thereof. On the other hand, the lower end of this system is disposed within the conditioned room F and portions of its structure are received within a slotted opening 495 in a portion of the wall G. This insures that the properly cooled and dried distorted sheets will be successively removed from the controlled atmosphere of the tunnel P and delivered into the atmosphere of the conditioned room without undesired passage of the sheets through relatively impure air of the atmosphere in which the distorting apparatus is generally located. Thus as viewed in FIG. 46, the horizontal broken lines 496 indicate the position of the wall G with the upper end of the lowerator system R within the cooling tunnel P and the corresponding lower end within the room F.

More particularly, each of the aforementioned sprockets 493 is fixedly mounted, as in FIGS. 48 and 49, at the inner end of a related shaft 500 journaled in bearings 501; said bearings being secured to the under surfaces of channels 502 of horizontally disposed auxiliary framework structures 503 mounted along opposite sides of the framework 20. The shafts 500 are axially aligned and each shaft at its opposite or outer end is equipped with a sprocket 504. As viewed in FIGS. 46, 47 and 49, the sprockets 504 are driven from a source of power 505 through the medium of a transversely disposed common drive shaft 506. For this purpose, the shaft 506 is journaled in bearings 507 on the upper surfaces of the structures 503 and is equipped at its outer ends with sprockets 508 coupled to the sprockets 504 by individual sprocket chain belts 509. The shaft 506 is, in turn, connected to the source of power 505 by a sprocket 510, keyed thereon, and a sprocket chain belt 511 also trained about drive sprocket 512 on the output shaft of the power unit. The motor 513 of this unit is thus adapted to operatively drive the chain belts 488 of the conveyor system O substantially continuously and with the exception of interrupting controls such as will be later described. Normally, however, the speed of the chain belts 488 is maintained at about 90 inches per minute (i.p.m.). The tautness of the sprocket chain belts 509 is controlled by the provision of idler sprockets 514 mounted by adjusting brackets 515 on the adjacent channels 502.

The pair of chain belts 520, comprising the lowerator system R, are entrained about individual upper and lower sprockets 521 and 522 and are driven from an independent source of power 523. To this end, each of the upper sprockets 521 is freely rotatable on an associated shaft 500, as seen in FIG. 49, due to the provision of a sleeve bearing 524. The opposite or lower sprockets 522 are commonly keyed to a shaft 525 journaled in bearings 526 mounted on frame supporting structures 527 and 528. At one of its ends, as in FIG. 46, the shaft 525 is connected to the power unit 523 which is mounted on the frame structure 528. As in the case of the chain belts 445 of the elevator system N, the chain belts 520 in the present instance include a vertically disposed active flight 530 and a return flight 531; the active flight 530 moving downwarly in the direction of the indicated arrow E. As well, each of the chain belts 520 is equipped with frame supporting elements 532 which may be conventional chain links having outwardly directed lugs 533. The desired degree of tautness in each of the chain belts 520 is adjusted by idler sprockets 534 on a shaft 535 mounted in bearings 536 supported by adjusting brackets 537 on a horizontal beam 538 of the framework 20 (see FIG. 46).

Controlled operation of the motor 540 of the power unit 523 is initiated by means responsive to the position of frame A at the exit end of the conveyor system O. Thus, a pair of switches 541 are adapted to complete the functional circuitry of said motor when the arms 542 of both switches are substantially simultaneously engaged by the opposite support rods 44 of a sheet supporting frame A. Cessation of motor operation is controlled by means responsive to the lowering of a frame a predetermined distance and is devised to selectively halt the chain belts 520 with one pair of related support elements 532 in or slightly past a vertical plane through the axes of the aligned shafts 500 as seen in FIG. 47; a second pair of elements 532 supporting a frame A above the point at which it will be automatically transferred to the return conveyor table H and a third pair of support elements in the return flight 531.

Figure 50:
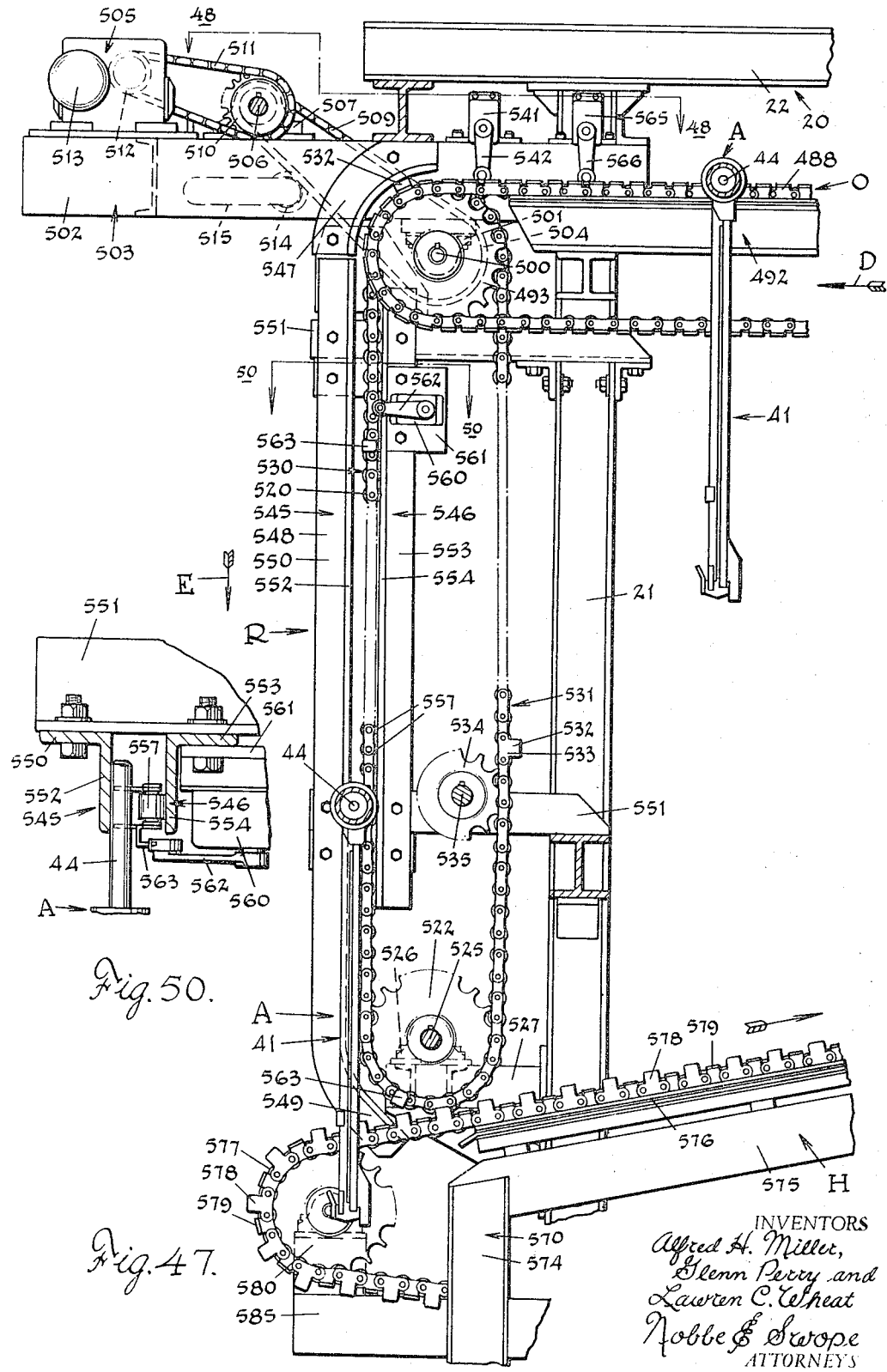
FIG. 50 is an enlarged horizontal section taken on line 50—50 of FIG. 47.

As previously described in connection with the elevating motion of the support frames A between the opposed surfaces 479 and 480 of the guideways 475 and 481, provision is similarly herein made for sustaining the rods 44 of a frame on the support elements 532 during their descent. To this end, pairs of guideways 545 and 546 are employed with each of the guideways 545 including an upper arcuate section 547, a vertical straight section 548 and an integral lower angularly inclined section 549. These sections are formed of an angled bar material and with the leg portions 550 thereof suitably supported on the auxiliary structures 503 or by brackets 551 secured to adjacent columns 21. The leg portions 552 of the respective sections provide a support surface for sliding engagement by the frame rods 44. The guide rails 546, on the other hand, are similarly mounted by the leg portions 553 on the brackets 551 while the leg portions 554 are arranged in parallel (FIG. 50) with the opposed leg portions 552 to afford a support surface for the rollers 555 of the respective chain belts 520.

Referring again to control of the motor 540, it will now be apparent that selective positioning of the support elements 532 can be employed to intermittently locate a support frame for convenient removal of the distorted sheets and more especially to locate a pair of elements 532 for engagement by a successively approaching frame A moving in the direction of the arrow D in FIG. 47. For this purpose, a switch 560 is mounted on one guideway 546 by plate 561 with an arm 562 adapted to be engaged by lugs 563 carried by selected links of one chain belt 520. As herein shown for purposes of illustration, the switch 560 is conveniently located beneath the actual transfer area of the frames A from the chain belts 488 to the chain belts 520 so as not to obstruct movement of the chains or the support frames lowered thereby. The lugs 563 are suitably spaced from the respective support elements 532 so as to successively engage the arm 562 of switch 560 and release the same as each of the pair of elements 532 approach the uppermost position where they are to be temporarily halted.

Ordinarily the power unit 523 is adjusted to operatively drive the pair of chain belts 520 at a rate of speed of 240–250 inches per minute. Also in the general operation of the shaping apparatus, it is contemplated that the support frames A will be transferred from the heating oven L into the cooling tunnel P in sufficiently spaced progression that the frames will be suitably separated in the tunnel by distances of from 12 to 18 inches. Accordingly, an interval will preferably be provided for the transfer of a frame A from conveyor system O to the lowerator system R to be effected before a subsequent frame arrives at the transfer area. Obviously in the event that the subsequent frame should enter the transfer area while the chain belts 520 are carrying out the lowering action of a preceding frame, there will be no elements 532 to receive the rods 44 of the said frame. This would inadvertently permit the frame to be carried still forwardly by the chain belts 488 and, in entering the pass defined by the arcuate sections 547, objectionably fall freely onto the supported frame therebeneath. To prevent such occurrences, means is herein provided which is responsive to the advancing movement of a subsequent frame to halt operation of the motor 513. To this end, a switch 565 is located so as to be engaged by one or both of the frame support rods 44 as in FIG. 43. At least, one switch 565 can thus be mounted on a structure 503 and so positioned that the arm 566 thereof will be engaged, to close the switch, and released before the rods 44 engage the arms 542 of the switches 541 controlling operation of the power unit 523. In one way or another, the switch or switches 565 are interlocked in the electrical circuitry of the motor 513 of power unit 505 to the end that operation of the chain belts 488 of the conveyor system O will be halted until the motor 540 ceases to function. In this connection, the circuit of switch or switches 565 can be further controlled by the switches 541 and 560 to be rendered effective subsequent to closure of the switches 541 and ineffective after engagement of the switch 560.

During the interval a support frame A is temporarily supported as indicated in FIG. 47, it is intended that the locking devices 52 will be released, permitting the arms 51 to be swung outwardly and the shaped sheets removed from the frame within the room F. When the switches 541 are again closed by the rods 44 of a subsequent frame on the conveyor system O, the then empty support frame will be lowered until the rods 44 enter the pass defined by the inclined guide sections 549. At the lower extremity of each section 549, the engaged rods 44 will be automatically discharged onto the conveyor chain belts of the return conveyor table H while the chain belts 520 continue to move until one of the lugs 563 is carried downwardly into engagement with the arm 562 of switch 560. At this time and upon halting of the lowerator system generally, a pair of elements 532 will be arranged to receive a subsequent frame A while the immediate frame fill be positioned as in FIG. 47 for removal of the distorted sheets.

*The return conveyor table*

As viewed in FIGS. 11, 13, 46 and 47, the table H includes a frame 570 formed with longitudinally disposed horizontal pairs of channels 571 and 572 and transversely disposed channels 573; all being supported by pedestals 574. It will be noted that the pair of channels 571 include angularly formed sections 575 which are inclined upwardly from the entry end of the table. These inclined sections are adapted to support the tracks 576 along the opposite sides of the frame and upon which the upper flights of a pair of conveyor chain belts 577 are carried. Each chain belt 577 is formed of links, as in FIG. 47, with alternating upwardly directed and horizontal outwardly directed lugs 578 and 579 respectively. Generally speaking, the pair of chain belts 577 are located inwardly of the adjacent pair of chain belts 520 of the lowerator system R and traverse endless paths defined by the arrangement of associated pairs of sprockets 580, 581 and 582. The upper flight of each chain belt is thus carried between sprockets 580 at the entry end of the table H and sprockets 581 at the exit end thereof. The sprockets 580 are mounted to support the entrained portions of the related chain belts beneath the upwardly disposed sprockets 522 of the system R and consequently the rods 44 of a support frame will be received on the horizontal lugs 579 of the chain belts 577 and moved forwardly by the vertical lugs 578 as said rods descend on the inclined sections 549 of the guideway 545 and disengage from the support elements 532 on chain belts 520. The sprockets 580 are individually mounted on stub shafts 583 journaled in pairs of bearings 584 carried by extended structures 585 at the opposite sides of the table frame 570. As seen in FIGS. 13 and 46, the spaced relation of the sprockets 580 permits unobstructed movement of the support frames A from the lowerator system R onto the conveyor table H with the securing members 41 and 42 being adapted to be received on an inclined deck of the return conveyor table. More especially, the open area thus provided permits removal of the distorted sheets to be rapidly and conveniently effected.

Adjacent the exit end of the table, the pair of sprockets 581 are secured at the opposite ends of a common shaft 586 journaled in bearings 587 on the upper surfaces of the horizontal portions of the frame channels 571. The return flights of chain belts 577 continue downwardly to the idler sprockets 582 and thence rearwardly to the sprockets 580; said sprockets 582 being supported by adjustable brackets 588 on adjacent pedestals 574. The chain belts 577 are driven by the sprockets 581 from a power unit 589, including a motor 590 and mounted on a plate 591 on the channels 572, through a sprocket chain belt 592 entrained about a sprocket 593 on shaft 586 and a drive sprocket 594 associated with the power unit. Preferably the chain belts 577 are substantially continuously operated at a speed of 250 inches per minute (i.p.m.).

The aforementioned deck 596 of the table H spans the open area between the side channels 571 and 572 and includes an arcuately formed entry end 597, a major inclined portion 598 and a substantially horizontally disposed exit platform 599.

Accordingly as the sheet support frames A are successively received on the return conveyor table H, the associated rods 44 are engaged by the chain belts 577 and the securing members 41 and 42 thus carried forwardly and angularly upward across the deck 596. Pending removal of a frame by the operation and carrying out the assembly and tensioning operation on the unit J, the motor 590 may be halted by the provision of switches (not shown) located adjacent the platform portion 599 and adapted to be engaged by a rod 44 as the frames approach the exit end of the return conveyor table.

Figure 34:
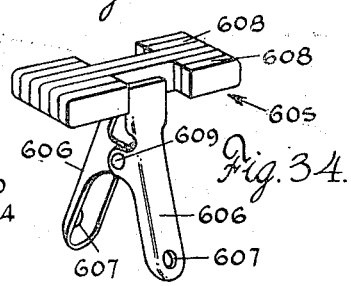
FIG. 34 is a perspective view of a clamp and traction element.

To control the actual degree of shaped curvature that is developed in a plastic sheet or sheets, it is commonly known practice to employ so-called traction members to produce downwardly directed movement of the plastic material as it becomes susceptible to the controlled atmosphere of a heating oven. Such induced downward movement and vertical stretching of the material overcomes to a controlled degree the lateral tension of the sheets. However, as the sheets become heated, the lateral tension is reduced and the distribution of the traction forces across the lower unsupported edges of the sheets creates a downward deflecting effect and resultant curvature in the sheet which curvature substantially corresponds to the position of the band of graded intensity to be established in a bent laminated glass window or windshield. One type of clamping member 605 employed for this purpose as illustrated in FIG. 34 includes spring-biased handles 606 equipped with holes 607. Clamping plates 608, secured to the handle portions above the pintle pin 609, are adapted to engage the marginal edges of the material. As shown in FIG. 12, a pair of such traction clamping members 605 are shown in connection with sheets supported in a frame A and in substantially equally spaced relation from the securing members 41 and 42 thereof. This exemplary showing, however, is not intended to be restrictive to the invention since additional clamping members of the same or modified type can be employed in spaced arrangement across the length of the thermoplastic material. Moreover, weighted members of varying size can be suspended from the holes 607 in the handles 606 to proportionately control the degree of downward deflection to be imposed on the thermoplastic material as it is heated and then cooled under controlled conditions.

Since the lower edges of the plurality of sheets are engaged in common between the clamping plates 608 of the traction members and initially stretched to uniform tautness before being finally clamped in and between the securing members 41 and 42 of a support frame, the curvature to which they are shaped while heat-softened is likewise expected to be uniform in each of the plurality of sheets.

As mentioned earlier, the controlled atmospheres of the shaping apparatus are afforded by the provision of a conditioning system which directs relatively cool, approximately 70° F., and dry air under pressure into the cooling tunnel P and causes movement of such air currents toward the elevator system N and thence downwardly into the heating oven L. In so doing, the air currents move continuously around and across the shaped sheets advancing through the tunnel P to cool and remove moisture therefrom before being drawn into the heated atmosphere of the oven L. For this purpose, a conditioning system is schematically shown in FIGS. 10 and 39 and will be seen to generally include an air drier unit 615 communicating by suitable ductwork to a stack (not shown) and also by ductwork 616 through a conventional cooling coil unit 617 to a louvered manifold 618 supported in the roof 33 of the cooling tunnel P. The currents of air under pressure thus introduced into the tunnel move in the direction of arrows designated by the numeral 619, through the tunnel and thence downward through the open area of the elevator system N into the heating oven L. It is believed that the pressure of the air moving downwardly into the heating oven L acts as a pneumatic cushion to obstruct upward movement of the air within the oven which operates to maintain more or less regulated temperatures therein. At suitably spaced distances along the side walls of the oven, units 620 are provided to withdraw air from the upper area of the oven through ducts 621 (FIG. 39) passing through the partition 28, suitably heat and dry the air and then return amounts of reconditioned air to the oven through ducts 622. The direction of air currents is generally shown by the several broken-line arrows designated by the numeral 623. These units 620 are arranged to provide zones of differing temperature within the oven and thus regulate the rate at which the thermoplastic sheets will become heat-softened. The desired ranges of temperature can be determined by the lengths of the supported sheets, the amount of distortion to be developed therein and the conditions of residual moisture retained by the material when stored. By way of example, such temperatures can be regulated to provide entry zones of about 180° F. rising to 225° F. in the exit area of the oven; substantially constant temperatures within a range of 200° F. or temperatures initially regulated to 225° F. and then lowered to 180° F. Thus, from the vicinity of the elevator system N to the end wall 26, the atmosphere of the oven L can if desired be progressively and thermally increased to the end that the sheets entering the oven are initially subjected to the highest temperatures and progressively to lower though relatively warm temperatures until the sheets are softened and shaped as contemplated. A hood 624 connected to suitable exhaust fans is provided adjacent to and above the slot 376 in the end wall 26 to remove heated air to be withdrawn or escaping from the oven.

*Complete operation*

In reviewing operation of the shaping apparatus, it is now believed to be more readily understood that the sheet supporting frames A (FIGS. 4 to 9) are constructed with a carrier bar 40 having supporting rods 44 at the opposite ends thereof which support the frame throughout the shaping operation. Each frame is equipped with a substantially fixed securing or clamping member 41 and an axially movable securing or clamping member 42 adapted to be adjusted along the carrier bar 40 in accord with the required lengths of the ultimately shaped sheets of thermoplastic material. As well, each clamping member comprises a channeled arm 50 and a clamping arm 51 by which the ends of the sheet material are secured and held in lateral tension. This clamped relation of the arms is maintained by locking members 52.

The end supporting rods 44 are adapted to carry the frames A through the substantially continuous circuitous path as along the conveyor chain belts 577 of the return conveyor table H (FIG. 11) until said frames are manually removed onto the assembly and stretching unit J. The assembled sheets and support frame are then advanced onto the oven delivery table K which is provided with conveyor chain belts 390 adapted to move said frame into the heating oven L during engagement with the related rods 44. In the entry end of the oven (FIG. 13), the rods 44 are automatically transferred from the chain belts 390 onto the pairs of chain belts 415, comprising the conveyor system M, and are thus carried through the heated atmosphere of the oven in the direction of the arrow B. During this heating phase of the distorting operation, the traction members 605 act to stretch the material downwardly and, as the lateral tension is relaxed, shape the sheet material to the desired curvature.

Also, as the frames are advanced through the oven L, the associated support rods 44 are engaged by the stop-bars 421 at a suitable distance from the sprockets 406 to automatically establish a desirable spacing between the frames. Thus, while each frame is engaged by the stop-bars 421, a preceding frame is advanced a selected distance and then actuates switches 423 to permit lowering of the stop-bars 421 by springs 425. The rods 44 of the then released frame, in resuming its forward movement, engage the switches 422 to again cause raising of the stop-bars to interrupt movement of a subsequent frame. While serving to provide a desired spaced distance between the frames during continued movement through the heating oven, the stop-bars further operate to insure that the support rods 44 of each frame are axially aligned in transverse relation to the conveyor system M.

At the exit end of the oven L (FIG. 40) the rods 44 of each support frame A successively engage the pair of switch arms 473 to initiate operation of the chain belts 445 of elevator system N thus raising the frame to a midway position between conveyor systems M and O. As earlier set forth, it is preferred that the rods of each frame be axially aligned and parallel with the transverse axis of the oven to insure positive engagement of both rods with the support members 465 on the pair of chain belts 445. Operation of the elevator system is discontinued as each frame in succession is transferred automatically from the chain belts 445 onto the chain belts 488 of the conveyor system O in the cooling tunnel P and the switch 484 is engaged.

As the softened sheets are carried through the cooling atmosphere of the tunnel P, they become sufficiently "set" to retain the shaped curvature produced by the heat of the oven L. And as the sheet supporting frames approach the exit end of the tunnel, they are carried over the open areas 35 in the bottom wall 34 of the tunnel. This permits the operators, at the assembly unit J therebeneath, to reach through the openings and remove the traction members 605 from the shaped sheets. At the exit end of the tunnel, the frames A are received on the chain belts 520 of the lowerator system R (FIG. 47). This transfer is automatically effected upon closure of the switches 541 to produce downward movement of each successive frame to the elevation illustrated in FIG. 47 where the frame is temporarily halted for the convenient removal of the shaped sheets in the controlled atmosphere of the room F. Cessation of such frame movement is produced by engagement of a lug 563 with the switch 560. In sequence, each empty frame is lowered for automatic discharge onto the chain belts 577 of the return conveyor table H from which the frame is removed for subsequent assembly with thermoplastic sheet material.

The assembly phase of the plastic sheet shaping operation constitutes a vitally important factor in satisfactory carrying out this invention. Thus, it is believed that plastic sheeting, as obtained in continuous, spirally wound rolls, will possess varying degree of tension due to inadvertently occurring or normally expected conditions which may cause the tension of one spirally wound roll to differ from one or more other rolls. Consequently a novel feature of this invention is believed to reside in the provision of means for simultaneously withdrawing substantially continuous lengths of the plastic sheet material from a plurality of supply rolls and to then permit each of the several lengths to hang freely in a looped or festooned condition whereby the tension created during winding of a roll will be dissipated and the sheeting permitted to relax lengthwise until each looped length of sheeting is substantially uniform with the others. In other words, during this period of relaxation, the inherent "elastic memory" of the material causes it to resume the normally expected lineal and transverse proportions. Following this important step, the lengths of sheeting are supplied to the assembly and stretching unit J and in this connection reference is now made to FIGS. 51 to 56.

Figure 51:
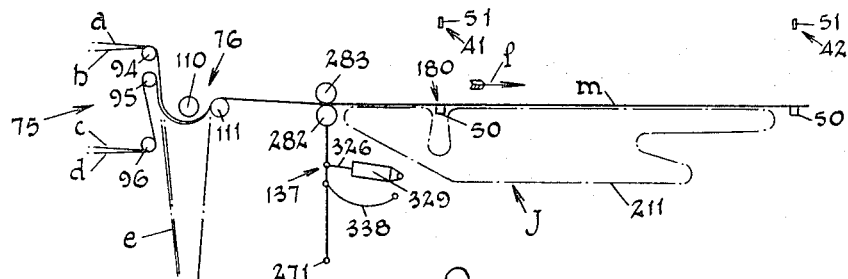
FIGS. 51–56 are a series of views illustrating the sequential steps carried out in the assembly of thermoplastic sheets on a support frame.

As seen in FIG. 51, a frame A has been positioned on the unit J with the channeled arm 50 of the securing member 41 positioned on the locator device 180, with the clamping arm 51 supported in a hanger 356, and the arm 50 of securing member 42 on the platform 181 and the associated arm 51 similarly engaged by a hanger 356. The power sources 244 and 291 are then operated to drive the belt 211 and the traction rolls 282 and 283, thereby drawing the several layers or plies of sheeting a, b, c and d from the freely supported looped or festooned arrangement e over the roll 111 and forward in the direction of the arrow designated by the letter f. When the required lengths of material m have been drawn and supplied to the unit J, the gaging unit 308 causes the motor 297 to halt thereby stopping the traction rolls 282 and 283; forward motion of the conveyor belt 211 also being halted at this time by similar control of the power unit 244. The free ends of the sheeting will thus be located substantially on or beyond the channeled member 50 of the securing member 42 as shown.

Figure 52:
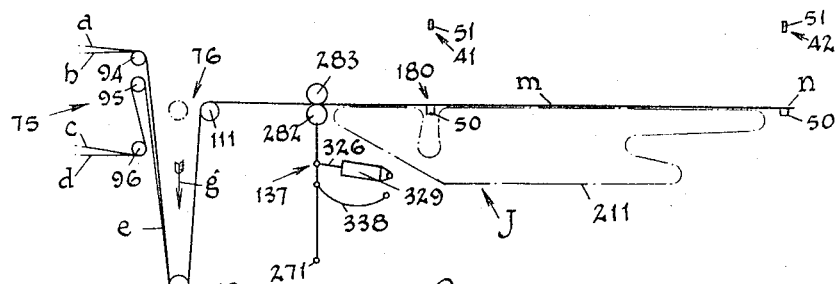

Reference being made to FIG. 52, the operator adjacent the platform 181 now causes the roll 110 to move downwardly as indicated by the arrow, designated by the letter g, to remove further lengths of the plastic sheeting from the several rolls 84. It will be appreciated that when the rolls 282 and 283 are idle, the pinching effect produced by the springs 319 on the roll 283 acts to prevent objectionable retraction of the lengths of sheeting on the unit J. Also as shown, the lengths of sheeting between their free ends and traction rolls will be superimposed one on another by the operator to bring said free ends n into substantial registration before they are placed over the channel 61 in the arm 50 of securing member 42; forced therein by the related clamping arm 51 and secured by the associated locking device 52.

Figure 53:
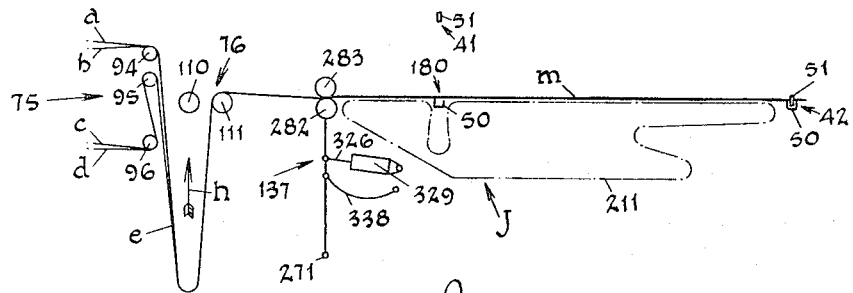

As viewed in FIG. 53, while this sequence of the assembly is being completed, the roll 110 is moved upwardly, as indicated by the arrow designated by the letter h. Since the normal physically relaxed characteristic of the plastic material is believed to have been obtained or restored while the layers of sheeting are freely suspended in looped formation, it is believed equally true that the same physical condition in the lengths of sheeting between traction rolls 282 and 283 and the securing member 42 will be substantially uniform. In other words, there will be no physical lengthening or shortening of one layer with regard to the other layers due to initial conditions of tension. This has been found to be equally true in connection with the assembly of one sheet in a support frame to insure that the length of the physically relaxed sheet will conform to the required length between the securing members 41 and 42.

Figure 54:
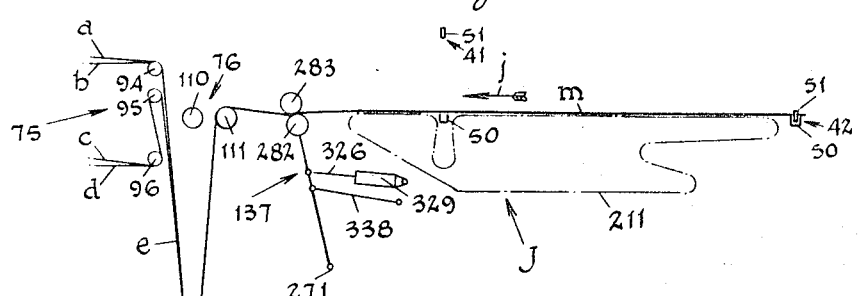

Consequently, during the tensioning or stretching of the plastic layers m, as in FIG. 54, the same degree of lateral tension will be uniformly created in each of the layers as the roll frame 137 is pivotally moved outwardly and by the pinching effect of the rolls 282 and 283 to produce simultaneous physical lengthening of the material in the direction of the arrow designated by the letter j. Thus, upon application of pressure through the conduit 332, the cylinder 329 will cause the piston rod 326 to swing or pivot the frame 137 outwardly until restrained by the determined lengths of the chains 338. Since this lateral stretching of the sheets is produced between the secured free ends and the rolls 282 and 283, the degree of tension developed in the material is slightly greater than the desired degree of lateral tension to be created or maintained in the lengths of sheeting when secured in members 41 and 42. Thus, when the clamping arm 51 of the member 41 presses the layer or several layers into the channel 61 of the associated arm 50, the tension of the material will pull the layers from the ends secured in the member 42 and thereby permit this tension to become equalized between the members 41 and 42.

Figure 55:
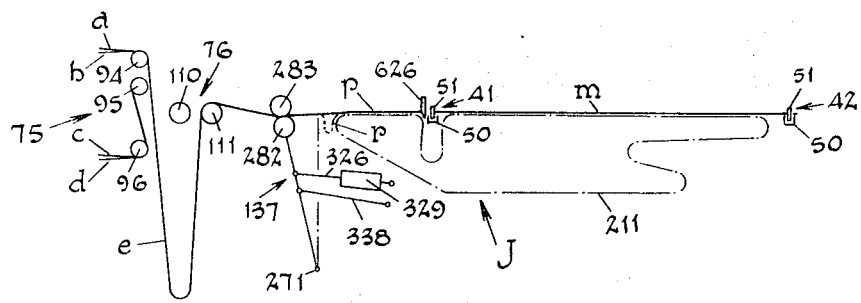
Figure 56:
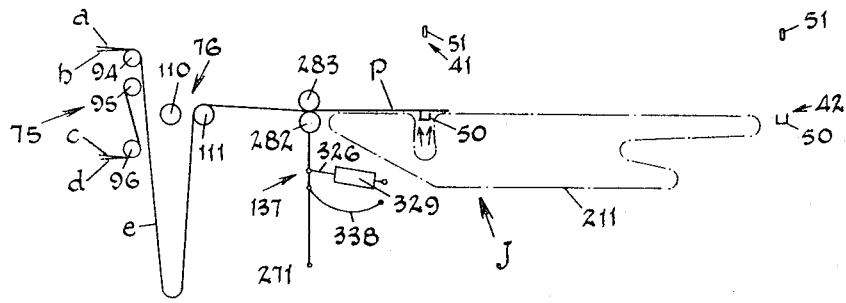

As illustrated in FIG. 55, when securing of the material in the member 41 has been completed, the operator severs the sheeting m with a knife 626 along the outwardly disposed side of member 41. The resulting free ends p of the continuous lengths of sheet material extend from the rolls 282 and 283 onto the deck panel 166 and as the support frame 137 is moved inwardly will sag downwardly as at r between the said rolls and the roll 212. Preparatory to removal of the frame A, one or more pairs of traction members 605 are attached in spaced relation along the adjacent and lower edges of the sheets. In this connection, it will be noted that the colored bands along the margins of the several sheets of plastic material are in superimposed registration with one another and located adjacent the carrier bar 40 since when the sheets are supported in a vertical plane during the shaping operation, the colored bands will be at the upper marginal areas and thus will be eventually located in proper registry with the upper margins of the glass sheets with which each shaped sheet will be assembled.

The frame A is lifted from the assembly unit J and moved forwardly onto the oven delivery table K upon which the support rods 44 are engaged by the chain belts 390. The frame thus enters the heating oven L and the shaping operation is begun.

After a subsequent frame A has been placed on the unit J, the operator pulls the lengths p of sheeting on the support panel 166 forwardly over the groove area of the locator device 180. The aforementioned use of air under pressure through the holes 260 of tubular member 192 can now be employed to produce jets of air between the vertical legs 196 of members 195 to create a blanket of air within the locator groove and against the lower surface of the sheeting. This supporting action is of relatively short duration, yet it acts to lift the sheet material from the conveyor belt 211 in the vicinity of the roll 213, across the open area of the locator device and onto section of the belt moving from the roll 215 over the deck panel 167.

While the assembly operation has been illustrated on a step-wise basis in FIGS. 51 through FIG. 56, it is believed understandable that in actual practice several of such steps can be substantially simultaneously carried out. Thus, after the lengths of sheeting have been drawn onto the support panel 168, clamping of the sheets in members 41 and 42 can be concurrently completed. In other words, the steps of the assembly operation shown in FIGS. 51 to 53 are completed by one operator working at one side of the frame A while the steps of operation shown in FIGS. 53 to 55 are being carried out by a second operator. In consequence, the actual interval of time elapsing between the removal of a support frame A from the return conveyor table H, the assembly with sheets of plastic material on the unit J and movement onto the oven conveyor table K is relatively short and adapted to afford an efficient cycle of operation.

Figure 57:
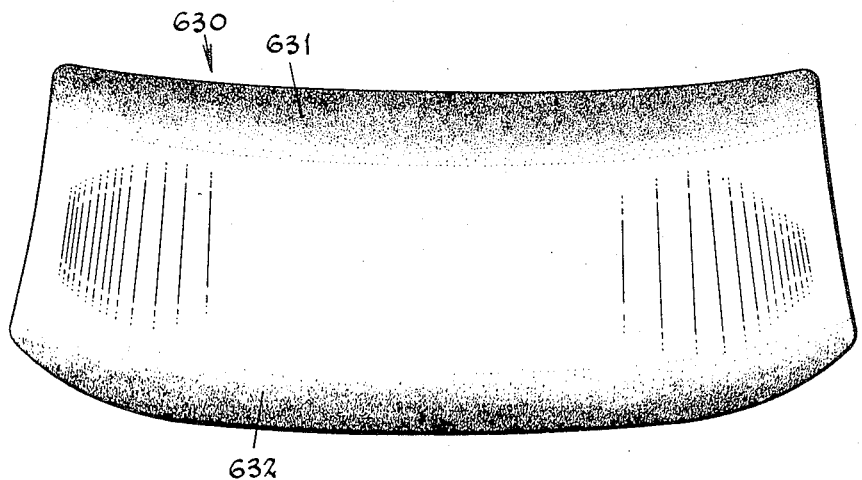
FIG. 57 is a front elevation of a windshield embodying a modified form of the invention.

Referring now to FIG. 57, there is shown a laminated glass windshield 630 having a glare-reducing band or area 631 disposed along its upper margin and a second glare-reducing band or area 632 along its lower margin. While utility of the upper glare-reducing area, as illustrated at 15 in FIG. 2 and at 631 in FIG. 53, has been fully set forth hereinabove, it has also been found advantageous to provide a lower or second glare-reducing area, as indicated at 632, to eliminate objectionable glare resulting from the hood or dash panel of an automobile. The thermoplastic interlayer for such a laminated structure is initially prepared with parallel color bands of glare-reducing properties along the marginal edges of substantially continuous sheeting material. Rolls of such modified material when mounted in the supply unit 75 are then employed to supply the assembly and stretching unit J in the same manner as that hereinabove described.

It is to be understood that the form of the invention herewith shown and described is to be taken as an illustrative embodiment only of the same, and that various changes in the shape, size and arrangement of parts, as well as various procedural changes may be restorted to without departing from the spirit of the invention.

We claim:

1. Apparatus for shaping thermoplastic sheets comprising,
   (a) a substantially horizontal supporting table,
   (b) a source of plastic including means located at one side of the table for supporting substantially continuous plastic sheeting,
   (c) a plastic shaping frame horizontally supported on said table,
   (d) means for receiving the plastic sheeting from said source of supply and conveying it over the table and frame,
   (e) means for clamping the free end of the sheeting in the frame,
   (f) means for creating lengthwise tension in the sheeting,
   (g) means for clamping the tensioned sheeting in the frame at a point between the clamped end of the sheeting and the tensioning means whereby said sheeting may be cut transversely outwardly of the second clamping means to provide an individual sheet clamped under tension in said frame,
   (h) a heating chamber and a cooling chamber communicating with one another,
   (i) means for supporting the frame and plastic sheet carried thereby in a vertical position and for conveying them successively through the heating and cooling chambers, and
   (j) means engaging the sheet adjacent its lower edge to apply a tractive force thereto in the plane of the sheet to effect the shaping of said sheet as it passes through said heating and cooling chambers.

2. Apparatus for shaping thermoplastic sheets comprising,
   (a) a substantially horizontal supporting table,
   (b) a source of plastic including means located at one side of the table for supporting a plurality of substantially continuous lengths of plastic sheeting,
   (c) a plastic shaping frame horizontally supported on said table,
   (d) means for receiving a plurality of substantially continuous lengths of sheeting from the said source of supply and conveying them over the table and frame, in superimposed contacting relation,
   (e) means for clamping the free ends of the lengths of sheeting in the frame,
   (f) means for creating lengthwise tension in the lengths of sheeting,
   (g) means for clamping the lengths of tensioned sheeting in the frame at a point between the clamped ends of said lengths of sheeting and the tensioning means whereby the lengths of sheeting may be cut transversely outwardly of the second clamping means to provide a plurality of individual sheets clamped under tension in said frame,
   (h) a heating chamber and a cooling chamber communicating with one another,
   (i) means for supporting the frame and plastic sheets carried thereby in a vertical position and for conveying them successively through the heating chamber and cooling chamber, and
   (j) means engaging the sheets adjacent their lower edges to apply a tractive force thereto in the plane of the sheets to effect the shaping of said sheets as they pass through said heating and cooling chambers.

3. Apparatus for shaping thermoplastic sheets as defined in claim 1, in which
   (a) said tensioning means includes a pair of feed rolls for receiving the plastic sheeting from the source of supply, and
   (b) said means for conveying the plastic sheeting over the table comprises an endless conveyor positioned to receive the sheeting from said feed rolls.

4. Apparatus for shaping thermoplastic sheets as defined in claim 1, in which
   (a) said tensioning means comprises a pair of feed rolls for receiving the plastic sheeting from the source of supply and delivering it to said conveying means,
   (b) a frame in which the feed rolls are mounted one above the other,
   (c) means mounting said roll frame for swinging movement inwardly and outwardly relative to said table,
   (d) means for driving said feed rolls to feed the plastic sheeting therebetween,
   (e) means for automatically discontinuing rotation of the feed rolls when a predetermined length of sheeting is received on said table, and
   (f) means for swinging the roll frame outwardly to place the sheeting under lengthwise tension.

5. Apparatus for shaping thermoplastic sheets as defined in claim 4, in which
   (a) the means for rotating the feed rolls comprises a motor, and
   (b) the means for discontinuing rotation of said feed rolls comprises a linear gage connected in circuit with and driven by the motor for stopping said motor when a predetermined length of sheeting is received on said table.

6. Apparatus for shaping thermoplastic sheets as defined in claim 5, including
   (a) a second motor for driving said means for receiving the sheeting and conveying it over the table and frame, and
   (b) means connecting said second motor in circuit with the linear gage and motor for driving the feed rolls so that upon stopping of said feed rolls the operation of said conveying means will be simultaneously discontinued.

7. Apparatus for shaping thermoplastic sheets as defined in claim 4, including
   (a) means for limiting the outward swinging movement of the feed rolls,
   (b) said means being adjustable to vary the extent of said swinging movement.

8. Apparatus for shaping thermoplastic sheets as defined in claim 4, including a supporting framework and in which
   (a) the means for swinging the roll frame comprises a hydraulic cylinder mounted on the supporting framework and a plunger operatively connected to said roll frame,
   (b) the means for limiting the outward swinging movement of the roll frame comprises a flexible connector attached at one end to the roll frame and at its opposite end to the supporting framework, and
   (c) means for adjusting the effective length of said flexible connector to control the degree of outward swinging movement of the roll frame.

9. Apparatus for shaping thermoplastic sheets as defined in claim 1, which said plastic sheet supporting frame comprises
   (a) an elongated carrier bar,
   (b) sheet clamping means carried by said bar adjacent the opposite ends thereof, and
   (c) each of said clamping means including a fixed arm substantially U-shaped in cross section to provide an elongated groove, a swingably mounted arm adapted to be received in said groove, and means for locking the swingable arm to the fixed arm to clamp the plastic sheet therebetween.

10. Apparatus for shaping thermoplastic sheets as defined in claim 1, in which (a) the heating chamber comprises an elongated heating oven and the cooling chamber an elongated cooling tunnel located above the heating oven and having its entrance end in communication with the exit end of said heating oven, (b) means for introducing cool dry air into said cooling tunnel, and (c) means for circulating hot dry air through said heating oven.

11. Apparatus for shaping thermoplastic sheets as defined in claim 10, in which (a) the cooled dry air is introduced into the cooling tunnel adjacent the exit end thereof at a pressure sufficient to cause the air to travel rearwardly to the entrance end thereof and thence downwardly into the exit end of the heating oven and, (b) the air entering the heating oven from the cooling tunnel is withdrawn from said heating oven, dried and heated and then recirculated through the heating oven such that the heated air exhausts from the entrance end of the said heating oven.

12. Apparatus for shaping thermoplastic sheets as defined in claim 10, in which said conveyor means comprises (a) a conveyor extending lengthwise in said heating oven for receiving and supporting the frames and plastic sheets to be shaped in a vertical position, (b) an elevator conveyor extending between the exit end of the heating oven and the entrance end of the cooling tunnel for receiving the frames from the heating oven conveyor, (c) a conveyor extending lengthwise in said cooling tunnel for receiving the frames from the elevator conveyor, (d) a lowering conveyor for receiving the frames from the conveyor in the cooling tunnel, (e) separate motors for driving the conveyor in the heating oven and the conveyor in the cooling tunnel substantially continuously, and (f) separate motors for intermittently driving the elevator conveyor and the lowering conveyor.

13. Apparatus for shaping thermoplastic sheets as defined in claim 12, including (a) means carried by the elevator conveyor for lifting the frames from the conveyor in the heating oven, and (b) means cooperating with the frame lifting means on the elevator conveyor for discharging the frames onto the endless conveyor in the cooling tunnel.

14. Apparatus for shaping thermoplastic sheets as defined in claim 13, including (a) a switch connected in circuit with the motor for driving the elevator conveyor and actuated by a plastic sheet supporting frame carried by the conveyor in the heating oven when said frame reaches a predetermined position therein for starting the motor to cause operation of the elevator conveyor to lift the frame from the conveyor in the heating oven, and (b) a second switch also connected in circuit with said motor and engageable by one of the lifting members on the elevator conveyor for breaking the circuit and stopping the said motor after said elevator conveyor has elevated the frame a predetermined distance.

15. Apparatus for shaping thermoplastic sheets as defined in claim 14, including (a) a motor for driving the lowering conveyor, (b) a switch connected in circuit with the lowering conveyor motor and actuated by a plastic sheet supporting frame traveling along the conveyor in the cooling tunnel for completing said circuit and starting said motor to remove the frame from the cooling tunnel conveyor, and (c) a second switch on the lowering conveyor, and (d) means on the lowering conveyor for actuating said second switch to break the circuit through said motor to discontinue operation of the lowering conveyor.

References Cited

UNITED STATES PATENTS

| | | | |
|---|---|---|---|
| 2,062,642 | 12/1936 | Darrah | 263—8 |
| 2,370,381 | 2/1945 | Vaughan | 18—4 X |
| 2,700,007 | 1/1955 | Dennison et al. | 18—19 X |
| 2,711,560 | 6/1955 | Beckham | 18—19 |
| 2,783,500 | 3/1957 | Lazarr | 18—19 |
| 2,885,732 | 5/1957 | Kazmaier et al. | 18—19 X |
| 3,025,566 | 3/1962 | Kostur | 18—19 |
| 3,277,224 | 10/1966 | Whiteford | 18—19 X |

WILLIAM J. STEPHENSON, *Primary Examiner.*